United States Patent
Siti et al.

(10) Patent No.: US 9,014,253 B2
(45) Date of Patent: *Apr. 21, 2015

(54) APPARATUS AND METHOD FOR DETECTING COMMUNICATIONS FROM MULTIPLE SOURCES

(71) Applicants: STMicroelectronics S.r.l, Agrate Brianza (IT); The Regents of the University of California, Oakland, CA (US)

(72) Inventors: Massimiliano Siti, Milan (IT); Michael P. Fitz, Los Angeles, CA (US)

(73) Assignees: STMicroelectronics, S.r.l., Agrate Brianza (IT); The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,943

(22) Filed: Jan. 7, 2013

(65) Prior Publication Data

US 2013/0215955 A1    Aug. 22, 2013

Related U.S. Application Data

(62) Division of application No. 11/989,055, filed as application No. PCT/US2006/028256 on Jul. 20, 2005, now Pat. No. 8,351,529.

(60) Provisional application No. 60/700,773, filed on Jul. 20, 2005.

(51) Int. Cl.
*H03H 7/30* (2006.01)
*H03H 7/40* (2006.01)
(Continued)

(52) U.S. Cl.
CPC .............. *H04L 25/06* (2013.01); *H04L 1/0052* (2013.01); *H04L 1/0054* (2013.01); *H04L 1/06* (2013.01); *H04L 25/03292* (2013.01); *H04L 25/03331* (2013.01); *H04L 2025/03414* (2013.01)

(58) Field of Classification Search
CPC .. H04B 7/0456; H04B 7/0478; H04B 7/0639; H04L 25/03343; H04L 25/06; H04L 1/0052; H04L 1/0054; H04L 25/03331; H04L 25/03414; H05L 25/03292
USPC .......................... 375/267, 320, 316, 349, 233
See application file for complete search history.

(56) References Cited

U.S. PATENT DOCUMENTS 6,687,492 B1 * 2/2004 Sugar et al. ................ 455/276.1
6,775,260 B1   8/2004 Dabak et al.
(Continued)

FOREIGN PATENT DOCUMENTS

EP    1460813    9/2004
EP    1471655    10/2004
(Continued)

OTHER PUBLICATIONS

Emanuele Viterbo et al., "A Universal Lattice Code Decoder for Fading Channels", IEEE Transactions on Information Theory, vol. 45, No. 5, Jul. 1999, pp. 1639-1642.
(Continued)

*Primary Examiner* — Shuwang Liu
*Assistant Examiner* — Sung Ahn
(74) *Attorney, Agent, or Firm* — Seed IP Law Group PLLC

(57) ABSTRACT

A method, apparatus, and computer program for detecting sequences of digitally modulated symbols transmitted by multiple sources are provided. A real-domain representation that separately treats in-phase and quadrature components of a received vector, channel gains, and a transmitted vector transmitted by the multiple sources is determined. The real-domain representation is processed to obtain a triangular matrix. In addition, at least one of the following is performed: (i) hard decision detection of a transmitted sequence and demapping of corresponding bits based on a reduced complexity search of a number of transmit sequences, and (ii) generation of bit soft-output values based on the reduced complexity search of the number of transmit sequences. The reduced complexity search is based on the triangular matrix.

48 Claims, 10 Drawing Sheets

(51) Int. Cl.

| | |
|---|---|
| H03K 5/159 | (2006.01) |
| H04L 25/06 | (2006.01) |
| H04L 1/00 | (2006.01) |
| H04L 1/06 | (2006.01) |
| H04L 25/03 | (2006.01) |

(56) References Cited

U.S. PATENT DOCUMENTS

| | | | | |
|---|---|---|---|---|
| 7,251,768 | B2* | 7/2007 | Giannakis et al. | 714/755 |
| 7,489,746 | B1 | 2/2009 | Awater et al. | |
| 7,551,664 | B2 | 6/2009 | Zhang et al. | |
| 7,616,695 | B1 | 11/2009 | Sarrigeorgidis | |
| 8,069,399 | B2 | 11/2011 | Osnato et al. | |
| 8,351,529 | B2* | 1/2013 | Siti et al. | 375/267 |
| 2002/0126772 | A1* | 9/2002 | Brunel | 375/340 |
| 2004/0076248 | A1 | 4/2004 | Purho | |
| 2004/0095993 | A1 | 5/2004 | Liu et al. | |
| 2004/0174939 | A1* | 9/2004 | Wang | 375/316 |
| 2005/0135498 | A1* | 6/2005 | Yee | 375/267 |
| 2005/0175122 | A1 | 8/2005 | Nefedov et al. | |
| 2005/0281351 | A1 | 12/2005 | Jeong et al. | |
| 2006/0188044 | A1* | 8/2006 | Wang et al. | 375/347 |
| 2006/0285531 | A1* | 12/2006 | Howard et al. | 370/343 |
| 2008/0310554 | A1 | 12/2008 | Siti et al. | |
| 2009/0154599 | A1 | 6/2009 | Siti et al. | |
| 2010/0111160 | A1 | 5/2010 | Siti | |
| 2013/0215955 | A1* | 8/2013 | Siti et al. | 375/233 |

FOREIGN PATENT DOCUMENTS

| | | |
|---|---|---|
| EP | 1521414 | 4/2005 |
| JP | 2004282757 | 10/2004 |
| JP | 2005176020 | 6/2005 |
| WO | 2004054191 | 6/2004 |
| WO | 2005034455 | 4/2005 |
| WO | 2007012053 | 1/2007 |

OTHER PUBLICATIONS

Albert M. Chan et al., "A New Reduced-Complexity Sphere Decoder for Multiple Antenna Systems", 2002 IEEE, pp. 460-464.
International Search Report dated Oct. 20, 2006 from International Application No. PCT/US2006/028256, 3 pages.
Wubben, D., "Near-Maximum-Likelihood-Detection of MIMO System using MMSE-based Lattice Reduction", Jun. 2004, Communication, 2004 IEEE International Conference, vol. 2, pp. 798-802.
Notification of Transmittal of International Preliminary Report on Patentability dated May 21, 2008 in connection with PCT Application No. PCT/US06/28256.
I. Emre Telatar, "Capacity of Multi-Antenna Gaussian Channels," Eur. Trans. Tel, 10, 6, 585-595, Nov. 1999, pp. 28.
G.J. Foschini and M. Gans, "On the Limits of Wireless Communication in a Fading Environment," Wireless Pers. Comm., 6, 311-355, Mar. 1998.
IEEE P802.11n™/D2.0, "Draft Amendment to [. . . ]—Part 11 : Wireless LAN Medium Access Control (MAC) and Physical Layer (PHY) specifications: Enhancements for Higher Throughput", A. Stephens et al., pp. 498, Feb. 2007.
IEEE Project P802.16-2004/Cor1-D5, Draft Corrigendum to IEEE Standard for Local and Metropolitan Area Networks—Part 16: Air Interface for Fixed Broadband Wireless Access Systems, pp. 288, Sep. 12, 2005.
Requirements and recommendations for WiMAX ForumTM Mobility Profiles, WiMAX1 Service Providers Working Group, Nov. 9, 2005, pp. 34.
W. van Etten, "Maximum Likelihood Receiver for Multiple Channel Transmission Systems", IEEE Trans, on Comms, vol. 24, No. 2, Feb. 1976, pp. 276-283.
H. Vincent Poor and Sergio Verdu', "Probability of Error in MMSE Multiuser Detection", IEEE Trans, on Information Theory, vol. 43, No. 3, May 1997, pp. 858-871.

P. W. Wolniansky, G. J. Foschini, G. D. Golden, R. A. Valenzuela, "V-BLAST: An Architecture for Realizing Very High Data Rates Over the Rich—Scattering Wireless Channel," invited paper, Proc. ISSSE-98, Pisa, Italy, Sep. 29, 1998, pp. 6.
G. J. Foschini, G. D. Golden, R. A. Valenzuela, P. W. Wolniansky, "Simplified Processing for High Spectral Efficiency Wireless Communications employing multi-element arrays," IEEE Journal on Selected Areas in Communications, vol. 17, No. 11, Nov. 1999, pp. 1841-1852.
Won-Joon Choi, Rohit Negi and John M. Cioffi, "Combined ML and DFE Decoding for the V-BLAST System", Proc. IEEE Int. Conf. on Communications, vol. 3, Jun. 2000, pp. 1243-1248.
Yuan Li and Zhi-Quan Luo, "Parallel Detection for V-BLAST System", IEEE GLOBECOM, vol. 1, May 2002, pp. 340-344.
Deric W. Waters and John R. Barry, "The Chase Family of Detection Algorithms for Multiple-Input Multiple-Ouput Channels", IEEE GLOBECOM, vol. 4, Nov. 2004, pp. 2635-2639.
Deric W. Waters and John R. Barry, "The Chase Family of Detection Algorithms for Multiple-Input Multiple-Ouput Channels", Submitted to IEEE Trans, on Information Theory, Sep. 2005.
Luis G. Barbero and John S. Thompson, "Rapid Prototyping of a Fixed-Throughput Sphere Decoder for MIMO Systems", IEEE Int. Conf. on Communications, Jun. 2006, pp. 6.
Erik Agrell, Thomas Eriksson, Alexander Vardy, and Kenneth Zeger, "Closest Point Search in Lattices," IEEE Trans, on Inf. Theory, vol. 48, No. 8, Aug. 2002, pp. 13.
Oussama Damen, Ammar Chkeif and Jean-Claude Belfiore, "Lattice Codes Decoder for Space-Time Codes", IEEE Communications Letters, vol. 4, No. 5, May 2000, pp. 161-163.
Emanuele Viterbo, Joseph Boutros, "A Universal Lattice Code Decoder for Fading Channels," IEEE Transactions on Information Theory, vol. 45, No. 5, Jul. 1999, pp. 4.
Mohamed Oussama Damen, Hesham El Gamal, Giuseppe Caire, "On Maximum-Likelihood Detection and the Search for the Closest Lattice Point," IEEE Transactions on Information Theory, vol. 49, No. 10, Oct. 2003, pp. 14.
Andreas Burg, Moritz Borgmann, Markus Wenk, Martin Zellweger, Wolfgang Fichtner, and Helmut Bolcskei, "VLSI implementation of MIMO detection using the sphere decoding algorithm", IEEE Journal of Solid-State Circuits, vol. 40, No. 7, Jul. 2005, pp. 1566-1577.
Richard van Nee, Ailed van Zelst,and Geert Awater, "Maximum likelihood decoding in a space division multiplexing system," Proc. VTC 2000, vol. 1 , 6-10.
IEEE 802.11-05/0149r1 , "WWiSE Proposal: High throughput extension to the 802.11 Standard," C. Kose, B. Edwards et al., Jan. 2005, pp. 91.
Babak Hassibi, "An efficient square-root algorithm for BLAST," in Proc. ICASSP, Istanbul, Turkey, Jun. 2000, pp. 11737-11740.
D. Wübben, R. Böhnke, J. Rinas, V. Kühn, and K. Kammeyer, "Efficient algorithm for decoding layered space-time codes," Electronic Letters, vol. 37, No. 22, Oct. 2001, pp. 1348-1350.
Deric W. Waters and John R. Barry, "Noise-predictive decision-feedback detection for multiple-input multiple-output channels," in press, IEEE Transactions on Signal Processing, vol. 53, No. 5, May 2005, pp. 1852-1859.
Bertrand M. Hochwald, Stephan ten Brink, "Achieving Near-Capacity on a Multiple-Antenna Channel," IEEE Trans, on Comms., vol. 51 , No. 3, Mar. 2003, pp. 30.
Mong Suan Yee, "Max-log Sphere Decoder," ICASSP 2005, pp. 4.
Joseph Boutros, Nicolas Gresset, Loic Brunel and Marc Fossorier, "Soft-input soft-output lattice sphere decoder for linear channels," Globecom 2003, pp. 5.
IEEE 802.11-04/898r1, N. Moschini, M. Siti et al., "STMicroelectronics Partial Proposal for LDPCC as optional coding technique for IEEE 802.11 TGn High Troughput Standard", Aug. 2004, pp. 44.
Damien Zuyderhoff, Xavier Wautelet, Antoine Dejonghe and Luc Vandendorpe, "MMSE Turbo Receiver for space-frequency bit-interleaved coded OFDM", IEEE Vehicular Technology Conference, vol. 1 , Oct. 2003, pp. 567-571.
IEEE 802.11-03/940r4, "IEEE P802.11 , Wireless LANs—TGn Channel Models"—May 2004, pp. 49.

(56) References Cited

OTHER PUBLICATIONS

Arul D. Murugan, Hesham El Gamal, Mohamed Oussama Damen and Giuseppe Caire, "A Unified Framework for Tree Search Decoding: Rediscovering the Sequential Decoder", submitted to IEEE Transactions on Information Theory,vol. 52, No. 3, Mar. 2006, pp. 21.
G. H. Golub and C. F. Van Loan, "Matrix Computations", Johns Hopkins University Press, Baltimore, MD, 1996, chapter 4, "Special Linear System", pp. 75.
G. H. Golub and C. F. Van Loan, "Matrix Computations", Johns Hopkins University Press, Baltimore, MD, 1996, chapter 5, "Orthogonalization and Least Squares", pp. 71.
Deric W. Waters and John R. Barry, "The Sorted-QR Chase Detector for Multiple-Input Multiple-Output Channels", IEEE Communications Society, Wireless Communications and Networking Conference, 2005 IEEE New Orleans, LA, USA Mar. 13-17, 2005, pp. 538-543.
Claude Berrou, Alain Glavieux and Punya Thitimajshima, "Near Shannon limit error-correcting coding and decoding: Turbo-codes", Proc. ICC 1993, May 1993, pp. 1064-1070.
Catherine Douillard, Michel Jezequel, Claude Berrou, Annie Picart, Pierre Didier and Alain Glavieux, "Iterative Correction of Intersymbol Interference: Turbo-Equalization", European Trans. on Telecomm. and Rel. Techn., vol. 6, Sep. 1995, pp. 507-511.
Mathini Sellathurai and Simon Haykin, "Turbo-BLAST for Wireless Communications: Theory and Experiments", IEEE Transactions on Signal Processing, vol. 50, Oct. 2002, pp. 2538-2546.
Ben Lu, Guosen Yue, and Xiaodong Wang, "Performance Analysis and Design Optimization of LDPC-Coded MIMO OFDM Systems," IEEE Transactions on Signal Processing, vol. 52, No. 2, Feb. 2004, pp. 348-361.
Massimiliano Siti and Michael P. Fitz, "A Novel Soft-Output Layered Orthogonal Lattice Detector for Multiple Antenna Communications.", Proc. IEEE Int. Conf. on Communications, Jun. 2006.
Alessandro Tomasoni, Marco Ferrari, Devis Gatti, Fabio Osnato and Sandro Bellini, "A Low Complexity Turbo MMSE Receiver for W-LAN MIMO Systems", Proc. IEEE Int. Conf. on Communications, Jun. 2006.
Yutaka Yasuda, Kanshiro Kashiki and Yasuo Hirata, "High-Rate Punctured Convolutional Codes for Soft Decision Viterbi Decoding", IEEE Transactions on Communications, vol. COM-32, No. 3, pp. 315-319, Mar. 1984.
S. Dolinar, D. Divsalar, "Weight Distributions for Turbo Codes Using Random and Nonrandom Permutations", JPL TDA Progr, Rep., vol. 42-122, pp. 56-65, Aug. 1995.
European Search Report, EP08152722, European Patent Office, Munich May 30, 2008.
Alessandro Tomasoni, Massimiliano Siti, Marco Ferrari, and Sandro Bellini, "Turbo-LORD: a MAP-approaching Soft-Input Soft-Output Detector for Iterative MIMO Receivers", Global Telecommunications Conference, 2007; IEEE Globecom 2007, pp. 3504-3508, XP031196593.
Massimiliano Siti and Michael P. Fitz, "On Layer Ordering Techniques for Near-optimal MIMO Detectors", 2007 8th IEEE Wireless Communications and Networking Conference, IEEE Piscataway, NJ, USA, 2007, pp. 1200-1205, XP007904694.
Massimiliano Siti and Michael P. Fitz, "On Reduced Complexity Soft-Output MIMO ML detection", IEEE Transactions on Information Theory, US, Mar. 24, 2006, pp. 1-43 XP007904695.

\* cited by examiner

APPARATUS AND METHOD FOR DETECTING COMMUNICATIONS FROM MULTIPLE SOURCES

PRIORITY CLAIM

The present application is a Continuation of copending U.S. patent application Ser. No. 11/989,055, filed Jan. 18, 2008; which is a national phase application filed pursuant to 35 USC §371 of International Patent Application Serial No. PCT/US2006028256, filed Jul. 20, 2006; which further claims the benefit of U.S. Provisional Patent Application Ser. No. 60/700,773 filed Jul. 20, 2005; all of the foregoing applications are incorporated by reference herein in their entireties.

TECHNICAL FIELD

This disclosure is generally directed to communication and computing systems and more specifically to an apparatus and method for detecting communications from multiple sources.

BACKGROUND

Wireless transmission through multiple antennas, often referred to as "MIMO" (Multiple-Input Multiple-Output), currently enjoys great popularity because of the demand for high data rate communication from multimedia services. Many applications are using or considering the use of MIMO to enhance the data rate or the robustness of communication links. These applications include the next generation of wireless LAN networks (such as IEEE 802.11n networks), mobile "WiMax" systems for fixed wireless access ("FWA"), and fourth generation ("4G") mobile terminals.

MIMO detection is often concerned with estimating the sequence of digitally modulated symbols simultaneously transmitted from multiple sources, such as from multiple transmitters or from a single transmitter with multiple antennas. A MIMO detector often receives as input a version of the sequence of digitally modulated symbols that has experienced co-antenna interference, been distorted by a fading channel, and been corrupted by noise.

In general, a narrow-band MIMO system can be represented by the following linear complex baseband equation:

$$Y = \sqrt{\frac{E_s}{T}} HX + N. \tag{1}$$

Here, T represents the number of transmit antennas. Y represents a received vector (size Rx 1), where R represents the number of receive antennas. X represents a transmitted vector (size Tx1). H represents an RxT channel matrix, where entries in the matrix represent complex path gains from transmitter to receiver samples of zero-mean Gaussian random variables with variance $\sigma^2=0.5$ per dimension. N represents a noise vector (size Rx1) containing elements that represent samples of independent circularly symmetric zero-mean complex Gaussian random variables with variance $N_0/2$ per dimension. $E_s$ represents a total per symbol transmitted energy (under the hypothesis that the average constellation energy is unity). Equation (1) may have to be considered valid per subcarrier in wideband orthogonal frequency division multiplexing ("OFDM") systems.

Maximum-Likelihood ("ML") detection is often desirable to achieve high performance in a communication system, as this is the optimal detection technique in the presence of additive white Gaussian noise ("AWGN"). ML detection typically involves finding the transmitted vector X that minimizes the minimum of the squared norm of the error vector, which can be expressed as follows:

$$\tilde{X} = \operatorname*{argmin}_{X} \left\| Y - \sqrt{\frac{E_s}{T}} HX \right\|^2. \tag{2}$$

Here, the notation corresponds to the commonly used linear MIMO channel, where independent and identically distributed ("IID") Rayleigh fading and ideal channel state information ("CSI") at the receiver are assumed. ML detection typically involves an exhaustive search over all of the possible $S^T$ sequences of digitally modulated symbols, where S is a Quadrature Amplitude Modulation ("QAM") or Phase Shift Keying ("PSK") constellation size and T is the number of transmit antennas. This means that ML detection often becomes increasingly unfeasible with the growth of the spectral efficiency.

Because of their reduced complexity, sub-optimal linear detection algorithms, such as Zero-Forcing ("ZF") or Minimum Mean Square Error ("MMSE") algorithms, are widely employed in wireless communications. These algorithms belong to the class of linear combinatorial nulling detectors. This means that estimates of each modulated symbol are obtained by considering the other symbols as interferers and performing a linear weighting of the signals received by all of the receive antennas.

To improve their performance, nonlinear detectors based on a combination of linear detectors and spatially ordered decision-feedback equalization ("O-DFE") have been proposed. In these techniques, the principles of interference cancellation and layer ordering were established. The terms "layer" and "antenna" and their derivatives may be used interchangeably in this document. In these detectors, a stage of ZF or MMSE linear detection, also called interference "nulling", is applied to determine T symbol estimates. Based on the "post-detection" signal-to-noise ratio ("SNR"), the first layer is detected. After that, each sub-stream in turn is considered the desired signal, and the other sub-streams are considered "interferers." Interference from the already detected signals is cancelled from the received signal, and nulling is performed on modified received vectors where fewer interferers are effectively present. This process is often called "interference cancellation (IC) and nulling" or "spatial DFE."

For interference cancellation, the order in which the transmit signals are detected may be critical for the performance of the detector. An optimal criterion has been established that corresponds to maximizing the minimum SNR ("maxi-min" criterion) over all possible orderings. Fortunately, for T transmit antennas, it can be demonstrated that only $T^*(T+1)/2$ dispositions of layers have to be considered to determine the optimal ordering, instead of all possible T! dispositions.

A better performing class of detectors may be represented by list detectors ("LDs"), which are based on a combination of the ML and DFE principles. The common idea is to divide the transmit streams to be detected into two groups. First, one or more reference transmit streams are selected, and a corresponding list of candidate constellation symbols is determined. Second, for each sequence in the list, interference is cancelled from the received signal, and the remaining symbol estimates are determined by sub-detectors operating on reduced size sub-channels. Compared to O-DFE, the differences lie in the criterion adopted to order the layers and in the fact that the symbol estimates for the first layer (i.e. prior to interference cancellation) are replaced by a list of candidates. The best performing variant corresponds to searching all possible S cases for a reference stream or layer and adopting spatial DFE for a properly selected set of the remaining T-1 sub-detectors. In this case, the list detector may be able to achieve full receive diversity and an SNR distance from ML in the order of fractions of decibels, provided that the layer order is properly selected. A notable property is that this can often be accomplished through a parallel implementation as the sub-detectors can operate independently. The optimal ordering criterion for list detectors stems from the principle of maximizing the worst-case post-detection SNR ("maximin"), as proposed for O-DFE. This results in computing the O-DFE ordering for T sub-channel matrices of size Rx(T−1), thus entailing a complexity of $O(T^4)$.

Besides performance (the benchmarks are optimal ML detection and linear MMSE and ZF on the two extremes, respectively), various features may be key for a MIMO detection algorithm to be effective and implementable in the next generation of wireless communication algorithms. These features may include:

- the overall complexity of the detection algorithm;
- the possibility of generating bit soft-output values (or log-likelihood ratios or "LLRs" if in the logarithmic domain), as this may yield a significant performance gain in wireless systems employing error correction codes ("ECC") coding and decoding algorithms; and
- a parallelizable architecture of the algorithm, which may be fundamental for an Application Specific Integrated Circuit ("ASIC") implementation or other implementation and for yielding the low latency required by a real-time high data rate transmission.

The various types of detectors mentioned above are often characterized by a number of disadvantages. For example, ZF and MMSE schemes are often highly sub-optimal since they yield a low spatial diversity order. For a MIMO system with T transmit antennas and R receive antennas, this is equal to R−T+1, as opposed to R for an ML detector. Also, in practical applications adopting MIMO-OFDM and ECC in bit-interleaved coded modulation ("BICM") schemes, a significant gap is observable for MMSE if R=T.

Not only that, nonlinear ZF or MMSE-based O-DFE schemes may have a limited performance improvement over linear ZF or MMSE schemes due to noise enhancements caused by nulling and error propagation caused by interference cancellation. Also, as with the linear detectors, the nonlinear detectors may suffer from ill-conditioned channel conditions. Further, the complexity of the original nonlinear algorithm is very high, $O(T^4)$, as it involves the computation of multiple Moore-Penrose pseudo-inverse matrices of decreasing size sub-channel matrices. More recent efficient implementations exist, though they still have a complexity of $O(T^3)$. In addition, no strategy to compute the bit soft metrics has been proposed and developed for O-DFE detectors.

List detectors also often suffer from several drawbacks. For example, a "parallel detection" (PD) algorithm used in list detectors suffers from a high computational complexity because T O-DFE detectors acting on Rx(T−1) sub-channel matrices have to be computed. This involves the computation of the related Moore-Penrose sub-channel pseudo-inverses. While this could be efficiently implemented through T complex "sorted" QR decompositions, the overall complexity is still in the order of $O(T^4)$. Moreover, known list-based detection algorithms do not incorporate a method to produce soft bit metrics for use in modern coding and decoding algorithms.

Another family of ML-approaching detectors is represented by lattice decoding algorithms, which are applicable if the received signal can be represented as a lattice. The terms "decoder" and "detector" and their derivatives may be used interchangeably in this document. The Sphere Decoder ("SD") is the most widely known algorithm in this family and can be utilized to attain hard-output ML performances with significantly reduced complexity. The operations of the SD algorithm can be divided into three steps: lattice formulation, lattice pre-processing, and lattice search.

In lattice formulation, the complex baseband model in Equation (1) is translated into the real domain, such as:

$$x = \begin{bmatrix} \text{real}(X) \\ \text{imag}(X) \end{bmatrix} y = \begin{bmatrix} \text{real}(Y) \\ \text{imag}(Y) \end{bmatrix} \quad (3)$$

with real vectors of respective sizes mx1 and nx1 (where m=2T and n=2R). The equivalent real channel matrix B can be expressed as follows:

$$B = \begin{bmatrix} \text{real}(H) & -\text{imag}(H) \\ \text{imag}(H) & \text{real}(H) \end{bmatrix} \quad (4)$$

which can be regarded as an nxm "lattice generator" matrix. Neglecting for simplicity possible scalar normalization factors, the SD algorithm typically attempts to find a solution to the following minimization problem:

$$\hat{x} = \underset{x}{\text{argmin}} \|y - Bx\|^2 \quad (5)$$

spanning the set of possible values for the in-phase (I) and quadrature-phase (Q) components of the complex digitally modulated symbols X independently, and restricting the search to a "sphere" of a given radius. In order to do that, the complex symbols may belong to a square constellation, such as QAM. Variants of this algorithm exist to deal with PSK constellations, but there is no a single algorithm derivation for dealing with both QAM and PSK constellations.

In lattice pre-processing, the real-domain channel matrix B is decomposed in order to isolate a triangular matrix factor R. Two known algorithms for doing this are based either on (1) the Cholesky decomposition of the Gram matrix $B^T B$ as in the original version of SD, or (2) the QR decomposition directly applied to B. Both are different ways of deriving a set of recursive equations to find a solution to the minimization problem in Equation (5).

In lattice search, the SD algorithm includes a set of recursive steps well known to those skilled in the art. If (i) R is an upper square triangular matrix having a size mxm and positive diagonal elements and (ii) y' is a mx1 vector obtained through a linear filter operation applied through the received vector y (i.e. y'=Ay, with A related to either the QR or Cholesky decomposition), then SD solves the equation:

$$\hat{x} = \underset{x}{\text{argmin}} \|y' - Rx\|^2 \quad (6)$$

restricting the search of sequences x to a sphere of radius C, such as:

$$\|y' - Rx\|^2 \leq C^2. \quad (7)$$

From Equation (7), a set of m inequalities can be obtained, where the bounds used to search for a given coordinate depend upon the values assigned to the previous ones. Proceeding in this way, once the algorithm has a candidate solution for the entire vector x, the radius is updated as the distance from the initial point and the new valid lattice point. If the decoder does not find any point in the constellation within the lower and upper bounds for some $x_k$ (assuming coordinates are searched in the order from $x_m$ to $x_1$), at least one bad candidate choice has been made for $x_{k+1}, k_{k+2}, \ldots, x_m$. The decoder then revises the choice for $x_{k+1}$ by finding another candidate in its range and proceeds again to find a solution for $x_k$. If no more candidates are available for $x_{k+1}$, the remaining possible values for $x_{k+2}$ are examined, and so on. The search ends when no possible points in the sphere remain to be evaluated. On average, the SD algorithm converges at the ML solution by searching for a number of lattice points much lower than the exhaustive $S^T$ sequences required by a "brute-force" ML detector.

However, the Sphere Decoder often presents a number of disadvantages. For example, the Sphere Decoder is an inherently serial detector. In other words, it spans the possible values for the I and Q pulse amplitude modulation ("PAM") components of the QAM symbols successively and thus is not suitable for a parallel implementation. Also, the number of lattice points to be searched is variable and sensitive to many parameters, such as the choice of the initial radius, the SNR, and the (fading) channel conditions. This implies a non-deterministic latency (or equivalently throughput) when applied to a practical implementation. In particular, this means it could be unsuitable for applications requiring a real-time response in data communications, such as in high-throughput 802.11n wireless LANs.

In addition, the need to reduce the size of the search before converging to the ML-approaching transmitted sequence in the Sphere Decoder is not always compatible with the need to find a number of (selected) sequences in order to generate bit soft-output information. For example, if $M_c$ is the number of bits per modulated symbol, the "max-log" approximation of bit LLRs may require finding a minimum of two sequences of X for every bit $b_k$ ($k=0, \ldots, T \cdot M_c$), such as one sequence where $b_k=1$ and one sequence where $b_k=0$. By definition, one of the two sequences is the (optimum) hard-decision ML solution. However, there is no guarantee using SD that the other sequence (where the value of the bit under consideration is reversed as compared to the corresponding bit value in the ML sequence) is one of the valid lattice points found by SD during the lattice search. One solution is to build a "candidate list" of points that constitutes a subset of the optimal sequences. However, this solution is approximated and not deterministic, meaning there is no guarantee that the desired sequences will be found unless the candidate list is sufficiently high. This involves a non-negligible trade-off between performance degradation and complexity. Limited simulation results for a soft-output SD have involved very complex iterative combined detection and decoding techniques and a high number of lattice points to be stored in the candidate list (>=512 for T<=4) or a candidate list with thousands of lattice points for 4×4 16 QAM and turbo coded modulation.

Other ML-approaching algorithms include a reduced set search approach, which may not yield good performance below a $10^{-4}$ bit error rate ("BER"). Yet another is an approximate method, which may involve a high complexity, and no results have been shown beyond a Quadrature Phase Shift Keying ("QPSK") constellation.

SUMMARY

This disclosure provides an apparatus and method for detecting communications from multiple sources.

In a first embodiment, a method detects sequences of digitally modulated symbols transmitted by multiple sources and received at a receiver. The method includes determining a real-domain representation that separately treats in-phase and quadrature components of a received vector, channel gains, and a transmitted vector transmitted by the multiple sources. The method also includes processing the real-domain representation to obtain a triangular matrix. In addition, the method includes performing, at the receiver, at least one of: (i) hard decision detection of a transmitted sequence and demapping of corresponding bits based on a reduced complexity search of a number of transmit sequences, and (ii) generation of bit soft-output values based on the reduced complexity search of the number of transmit sequences. The reduced complexity search is based on the triangular matrix.

In particular embodiments, channel state information and received observations are known at the receiver. The channel state information includes a complex matrix, where the complex matrix has entries representing complex gain channel paths between transmit and receive antennas. The received observations include a complex vector.

In other particular embodiments, the method also includes receiving, as input to a set of rules, one or more properties of a desired quadrature amplitude modulation (QAM) or phase shift keying (PSK) constellation to which the symbols belong.

In yet other particular embodiments, processing the real-domain representation includes processing equations of the real-domain representation to produce a factorization of a channel matrix into an orthogonal matrix and a triangular matrix. In still other particular embodiments, processing the real-domain representation includes forming a Gram matrix using a channel matrix and performing a Cholesky decomposition of the Gram matrix.

In a second embodiment, an apparatus detects sequences of digitally modulated symbols transmitted by multiple sources. The apparatus includes a detector operable to determine a real-domain representation that separately treats in-phase and quadrature components of a received vector, channel gains, and a transmitted vector transmitted by the multiple sources. The detector is also operable to process the real-domain representation to obtain a triangular matrix. In addition, the detector is operable to perform at least one of: (i) hard decision detection of a transmitted sequence and demapping of corresponding bits based on a reduced complexity search of a number of transmit sequences, and (ii) generation of bit soft-output values based on the reduced complexity search of the number of transmit sequences. The reduced complexity search is based on the triangular matrix.

In a third embodiment, a computer program is embodied on a computer readable medium and is capable of being executed by a processor. The computer program includes computer readable program code for determining a real-domain representation that separately treats in-phase and quadrature components of a received vector, channel gains, and a transmitted vector transmitted by multiple sources. The computer program also includes computer readable program code for processing the real-domain representation to obtain a triangular matrix. In addition, the computer program includes computer readable program code for performing at least one of: (i) hard decision detection of a transmitted sequence and demapping of corresponding bits based on a reduced complexity search of a number of transmit sequences, and (ii) generation of bit soft-output values based on the reduced complexity search of the number of transmit sequences. The reduced complexity search is based on the triangular matrix.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1A:
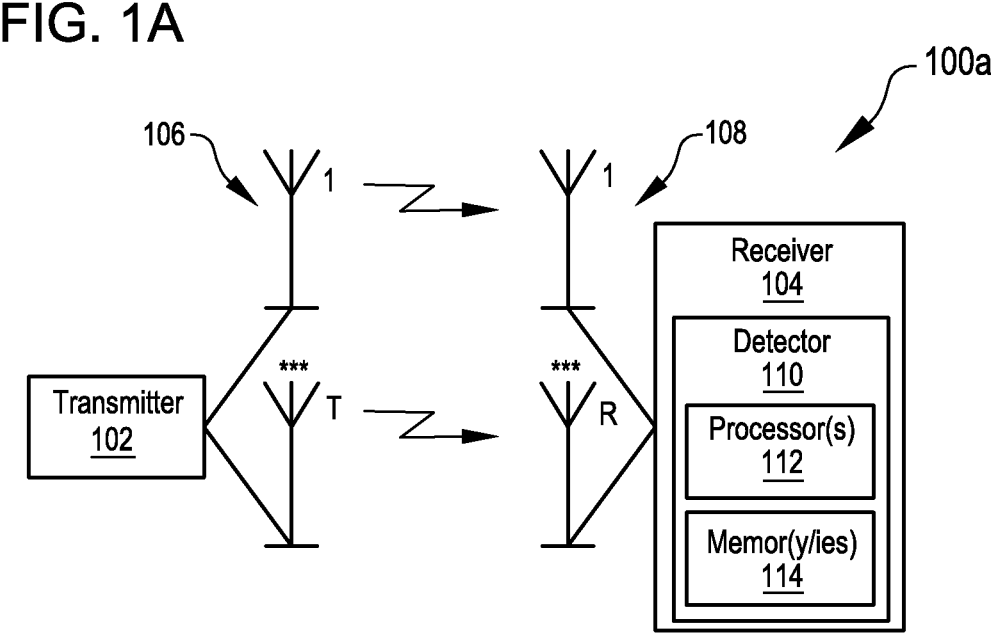
FIGS. 1A and 1B illustrate example systems for detecting communications from multiple sources in accordance with this disclosure.

FIGS. 1A through 17 and the various embodiments described in this disclosure are by way of illustration only and should not be construed in any way to limit the scope of the invention. Those skilled in the art will recognize that the various embodiments described in this disclosure may easily be modified and that such modifications fall within the scope of this disclosure.

This disclosure generally provides a technique for detecting sequences of digitally modulated symbols transmitted by multiple sources. For example, a detector may be capable of detecting sequences of digitally modulated symbols transmitted by multiple antennas. In some embodiments, the detector may belong to the class of detectors (or decoders) of discrete quantities sent by multiple antennas or other sources. In these embodiments, the detector finds the closest vector (in the case of two sources) or a close approximation of it (in the case of more than two sources) to a received lattice vector (or point) corrupted by noise. In particular embodiments, the detector can also obtain (in the case of two sources) or closely approximate (for more than two sources) the most likely sequences required for an optimal bit or symbol a-posteriori probability computation.

Optionally, all or part of the layers considered for detection can be ordered using a suitably designed ordering technique. For example, if more than two sources are present, the order of all or part of the sequence of layers considered for detection may affect the performance significantly. An ordering algorithm is provided in this disclosure, which may help to achieve optimal or near-optimal performance. Depending on the implementation, the detector described below achieves optimal performance for two sources. For more than two sources and hard-output, the detector may achieve near-optimal performance if the layers considered for detection are taken in a suitable order as determined according to the ordering algorithm discussed below. For more than two sources and soft-output, this disclosure may achieve near-optimal performance, which can be further enhanced if the layers considered for detection are taken in a suitable order as determined according to the ordering algorithm discussed below.

Depending on the implementation, the detector described below may be characterized by much lower complexity (compared to conventional ML detectors and to detectors having near-ML performance). Also, the detector described below may implement a technique to generate reliable soft-output metrics. In addition, the detector described below may be suitable for highly parallel hardware architectures, which may be a fundamental requirement for Very Large-Scale Integration ("VLSI") implementations and for applications requiring real-time or low latency responses.

Although described below as being used in a communication system to detect multiple communications, the techniques described in this disclosure could be used in other or additional environments. For example, the techniques described below could apply to other physical systems if the systems are described by mathematical models (such as Equation (1)) and require solving of a minimization problem (such as Equation (2)). This may include systems that implement closest point searches, shortest vector searches, or integer least squares. As a particular example, these techniques could be used to solve cryptography problems.

Figure 1B:
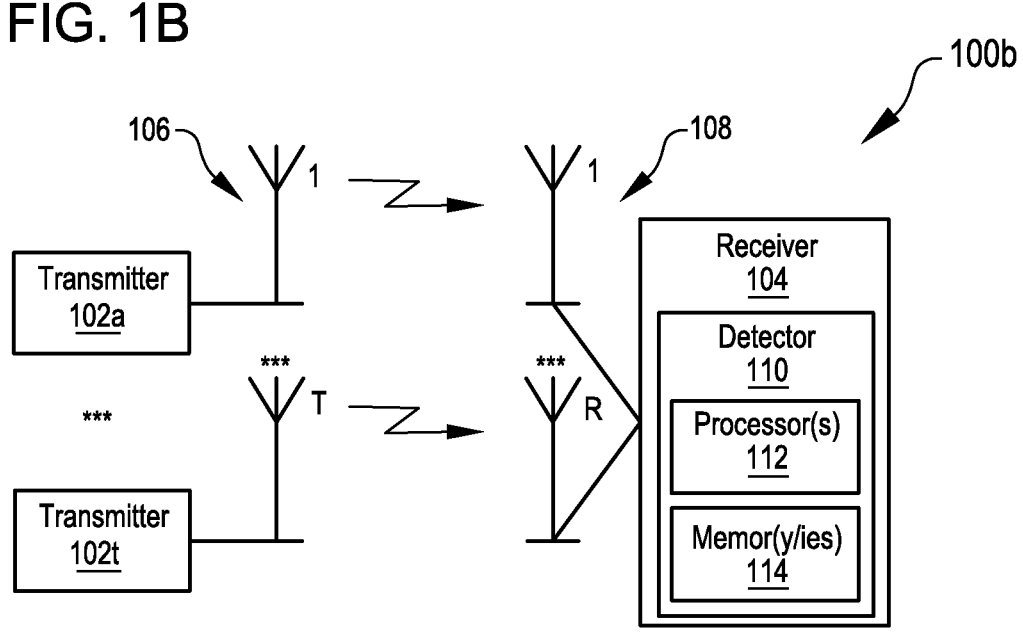

FIGS. 1A and 1B illustrate example systems 100a-100b for detecting multiple communication sources in accordance with this disclosure. In particular, FIGS. 1A and 1B illustrate example MIMO systems. These embodiments are for illustration only. Other embodiments of the systems 100a-100b could be used without departing from the scope of this disclosure.

As shown in FIG. 1A, the system 100a includes a transmitter 102 and a receiver 104. The transmitter 102 includes or is coupled to multiple transmit antennas 106 (denoted 1–T), and the receiver 104 includes or is coupled to multiple receive antennas 108 (denoted 1–R). As shown in FIG. 1B, the system 100b includes multiple transmitters 102a-102t and the receiver 104. In this example, each of the transmitters 102a-102t includes or is coupled to a single transmit antenna 106. Each of the transmitters 102, 102a-102t in FIGS. 1A and 1B represents any suitable device or component capable of generating or providing data for communication. The receiver 104 represents any suitable device or component capable of receiving communicated data.

In these examples, the receiver 104 includes a detector 110, which detects multiple communications from multiple sources. The multiple sources could include a single transmitter 102 with multiple antennas 106, multiple transmitters 102a-102t with one or several antennas 106 each, or a combination thereof. The detector 110 may operate as described in more detail below. The detector 110 includes any hardware, software, firmware, or combination thereof for detecting multiple communications from multiple sources. The detector 110 could be implemented in any suitable manner, such as by using an Application Specific Integrated Circuit ("ASIC"), Field Programmable Gate Array ("FPGA"), digital signal processor ("DSP"), or microprocessor. As a particular example, the detector 110 could include one or more processors 112 and one or more memories 114 capable of storing data and instructions used by the processors 112.

Either of the systems 100a-100b can be represented as in Equation (1), which may be valid for both single-carrier flat fading MIMO systems and for wideband OFDM systems (per subcarrier). The interpretation of Equation (1) is that the signal received at each antenna 108 by the receiver 104 represents the superposition of T transmitted signals corrupted by multiplicative fading and AWGN. As described below, a simplified yet near-optimal technique is provided to find the transmit sequence X maximizing the probability P(Y|X) (in other words, solving the minimization problem in Equation (2)).

Although FIGS. 1A and 1B illustrate examples of systems 100a-100b for detecting multiple communication sources, various changes may be made to FIGS. 1A and 1B. For example, a system could include any number of transmitters and any number of receivers. Also, each of the transmitters and receivers could include or be coupled to any number of antennas.

Figure 2A:
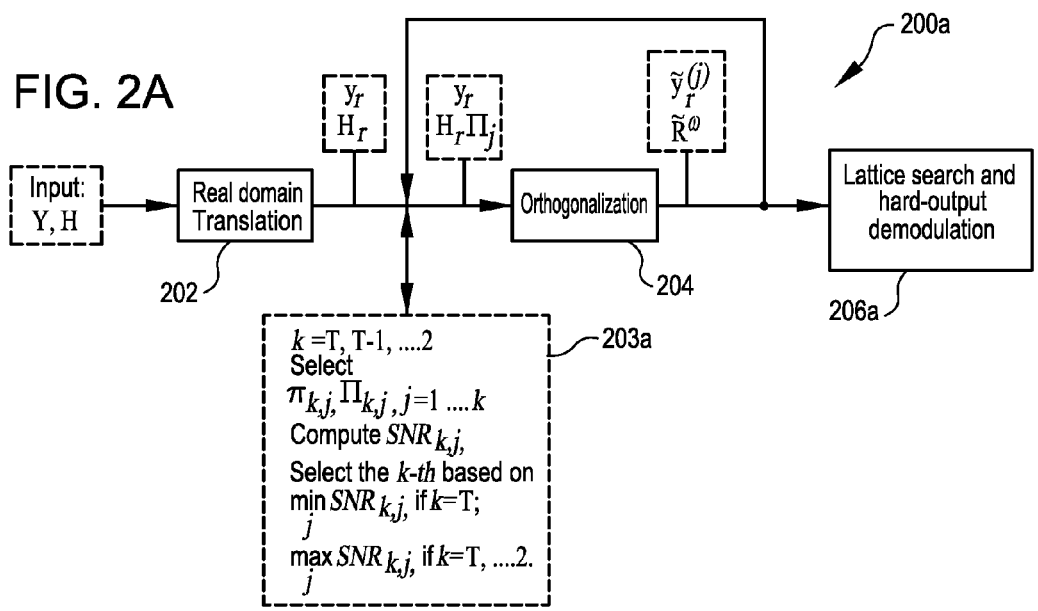
FIGS. 2A and 2B illustrate example methods for detecting communications from multiple sources in accordance with this disclosure.
Figure 2B:
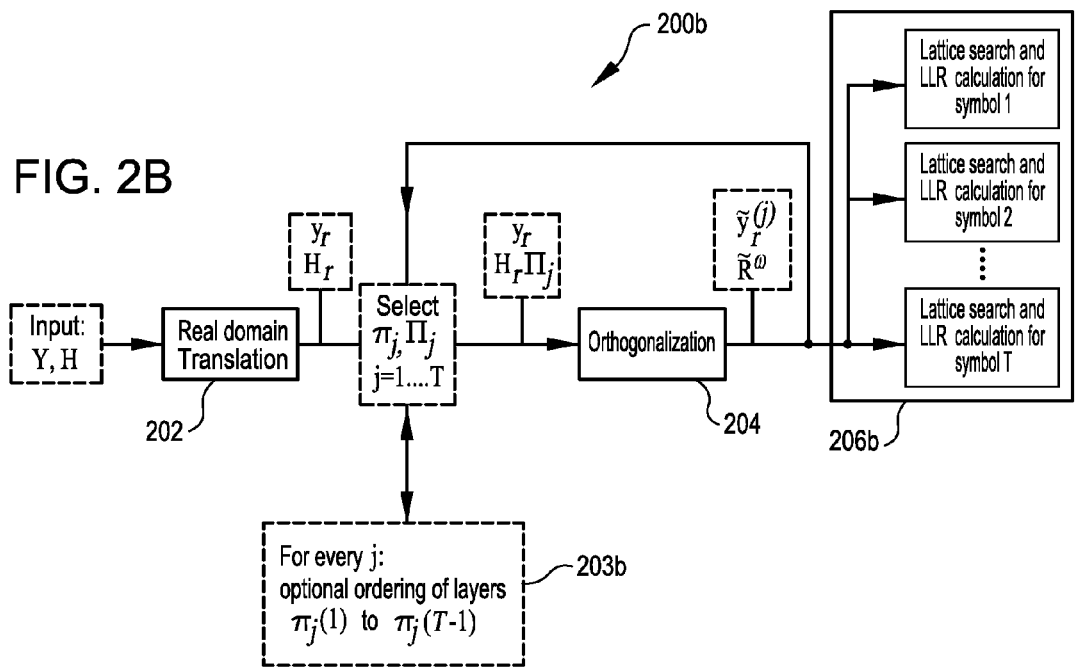

FIGS. 2A and 2B illustrate example methods 200a-200b for detecting multiple communication sources in accordance with this disclosure. The embodiments of the methods shown in FIGS. 2A and 2B are for illustration only. Other embodiments of the methods 200a-200b could be used without departing from the scope of this disclosure.

The methods 200a-200b can be performed by the detector 110, which could represent a layered orthogonal lattice detector, to detect communications from multiple sources. More specifically, the detector 110 could use the method 200a to detect sequences of digitally modulated symbols transmitted from multiple sources by finding the closest vector to a received lattice vector or point, or a close approximation of it. The method 200b shown in FIG. 2B can be performed by the detector 110 to optimally select or closely approximate the most likely sequences required for an optimal bit or symbol a-posteriori probability computation. In both cases, the detector 110 could have as input the received sequence Y and an (assumed known) channel state information matrix H.

As shown in FIG. 2A, a stage 202 in the method 200a involves computing a proper real-domain lattice representation of the system. Among other things, the real-domain lattice representation separately treats the I and Q components of a received vector, channel gains, and a transmitted vector.

A stage 204 involves pre-processing lattice equations of the real-domain lattice representation. The pre-processing is performed in order to obtain a triangular matrix with specific properties. For example, the pre-processing may involve factorizing the (real-domain) channel matrix into product terms, such as an orthogonal matrix and a triangular matrix. As another example, the pre-processing may involve computing the Gram matrix of the real channel matrix and the Cholesky decomposition of such a Gram matrix. This stage 204 may receive as input the channel matrix with columns ordered according to a selected layer disposition.

A stage 206a involves performing a lattice search and hard decision detection and demapping. These functions may be based on a properly designed reduced complexity search of a number of lattice points, while exploiting the properties of the triangular matrix. The search may also be based on a properly determined subset of transmit sequences.

Optionally, stage 203a could occur between stages 202 and 204. Optional stage 203a involves ordering the sequence of all, or part of, the layers considered for detection by stage 204. For example, stage 203a may involve ordering the transmit symbols considered for the successive detection based on the post-processed SNR. More specifically, this may involve selecting the layer permutations to be passed as input to stage 204 and receiving the post-detection SNR from stage 204. The post-detection SNR can be used to perform the layer selection based on suitable criteria.

Similarly, in FIG. 2B, the stage 202 involves computing a proper real-domain lattice representation, such as one that separately treats I and Q components of a received vector, channel gains, and a transmitted vector. The stage 204 involves pre-processing lattice equations of the real-domain lattice representation in order to obtain a triangular matrix with specific properties. In particular embodiments, the stage 204 may involve factorization of the real channel matrix into orthogonal and triangular product matrices or computing the Gram matrix of the real channel matrix and performing the Cholesky decomposition of such a Gram matrix.

A stage 206b involves performing a lattice search and generating bit soft-output values. Stage 206b may be based on a properly designed reduced complexity search of the number of lattice points, while exploiting the properties of the orthogonal matrix and the triangular matrix. Also, the generation of the bit soft-output values may be based on a search of a properly determined subset of transmit sequences. This stage 206b may optimally identify or closely approximate the most likely sequences required for an optimal bit or symbol a-posteriori probability computation. Optionally, stage 203b could occur between stages 202 and 204. Optional stage 203b could involve ordering the transmit symbols considered for the successive detection based on the post-processed SNR. It may also involve selecting the layer permutations to be passed as input to stage 204 and receiving the post-detection SNR from stage 204.

The following represents additional details of one particular implementation of the methods 200a-200b and the detector 110. These details are for illustration only. Other embodiments of the detector 110 and the methods 200a-200b could be used.

In FIG. 2A, the stages implement an algorithm for finding the transmit sequence X maximizing the probability P(Y|X). The first stage 202 involves the determination of a suitable "lattice" (real-domain) representation, which is different from the one given in Equations (3) and (4). For example, the I and Q components of the complex quantities can be taken in a different ordering, neglecting scalar normalization factors, as shown below:

$$x = [X_{1,I} X_{1,Q} \ldots X_{T,I} X_{T,Q}]^T = [x_1 x_2 \ldots x_{2T}]^T$$

$$y = [Y_{1,I} Y_{1,Q} \ldots Y_{R,I} Y_{R,Q}]^T = [y_1 y_2 \ldots y_{2R}]^T$$

$$N_r = [N_{1,I} N_{1,Q} \ldots N_{R,I} N_{R,Q}]^T$$

$$y = H_r x + N_r = [h_1 \ldots h_{2T}] x + N_r \quad (8)$$

The channel columns may have the form:

$$h_{2k-1} = [Re(H_{1,k}) Im(H_{1,k}) \ldots Re(H_{R,k}) Im(H_{R,k})]^T$$

$$h_{2k} = [-Im(H_{1,k}) Re(H_{1,k}) \ldots -Im(H_{R,k}) Re(H_{R,k})]^T \quad (9)$$

where $H_{j,k}$ represents the entries of the (complex) channel matrix H. As a consequence, the couples $h_{2k-1}, h_{2k}$ are already orthogonal ($h_{2k-1}^T \cdot h_{2k} = 0$). Other useful relations are given below:

$$\|h_{2k-1}\|^2 = \|h_{2k}\|^2$$

$$h_{2k-1}^T h_{2j-1} = h_{2k}^T h_{2j}, \; h_{2k-1}^T h_{2j} = -h_{2k}^T h_{2j-1} \quad (10)$$

where $k,j = \{1, \ldots, T\}$ and $k \neq j$. In the general case, the model may be valid if a general encoder matrix $G \in R^{m \times m}$ is considered such that:

$$x = Gu \quad (11)$$

where $u \in U \subset R^m$ is the information symbol sequence and x is the transmit codeword. In this case, the system equation may be given as:

$$y = H_r Gu + N_r \quad (12)$$

meaning the lattice generator matrix would become $H_r G$. Although uncoded MIMO systems are referred to for conciseness in the following description, the application of this technique is broader and valid for any general (lattice-) coded system.

In these embodiments, the stage 204 involves a pre-processing orthogonalization process of the (real-domain) channel matrix $H_r$. It will be understood that different matrix processing may be applied to $H_r$ without departing from the scope of this disclosure, such as the standard QR (which can be accomplished in several ways well known to those skilled in the art) or Cholesky decomposition algorithms.

The following pre-processing may occur during stage 204 when T=2 (there are two transmit antennas 106) and R≥2 (there are two or more receive antennas 108). In this description, the following notation is used: $\sigma_{2k-1}^2 \equiv \|h_{2k-1}\|^2$, $s_{j,k} \equiv h_j^T h_k$, $V_k = h_k^T y$. An efficient way to perform the QR decomposition of $H_r$ is through a Gram-Schmidt Orthogonalization ("GSO") process. In this process, there is an orthogonal matrix Q:

$$Q=[h_1\ h_2\ q_3\ q_4] \quad (13)$$

where:

$$q_3 = \sigma_1^2 h_3 - s_{1,3} h_1 - s_{2,3} h_2$$

$$q_4 = \sigma_1^2 h_4 + s_{2,3} h_1 - s_{1,3} h_2 \quad (14)$$

Q is a 2Rx2T orthogonal matrix such that:

$$Q^T Q = \mathrm{diag}[\sigma_1^2, \sigma_1^2, \|q_3\|^2, \|q_3\|^2]. \quad (15)$$

There is also a 2Tx 2T triangular matrix R such that $H_r = QR$:

$$R = \begin{bmatrix} 1 & 0 & s_{1,3}/\sigma_1^2 & s_{1,4}/\sigma_1^2 \\ 0 & 1 & -s_{1,4}/\sigma_1^2 & s_{1,3}/\sigma_1^2 \\ 0 & 0 & 1/\sigma_1^2 & 0 \\ 0 & 0 & 0 & 1/\sigma_1^2 \end{bmatrix}. \quad (16)$$

Multiplying Equation (8) by $Q^T$ provides:

$$\tilde{y} = Q^T y = \tilde{R} x + Q^T N_r = \tilde{R} x + \tilde{N}_r. \quad (17)$$

For the remainder of the processing, the following may be used instead of R:

$$\tilde{R} = \begin{bmatrix} \sigma_1^2 & 0 & s_{1,3} & s_{1,4} \\ 0 & \sigma_1^2 & -s_{1,4} & s_{1,3} \\ 0 & 0 & r_3 & 0 \\ 0 & 0 & 0 & r_3 \end{bmatrix} \quad (18)$$

where:

$$r_3 = \sigma_1^2 \sigma_3^2 - (s_{1,3})^2 - (s_{2,3})^2. \quad (19)$$

Also, from Equation (17), the following can be obtained:

$$\tilde{y} = \begin{bmatrix} \tilde{y}_1 \\ \tilde{y}_2 \\ \tilde{y}_3 \\ \tilde{y}_4 \end{bmatrix} = \begin{bmatrix} V_1 \\ V_2 \\ \sigma_1^2 V_3 - s_{1,3} \tilde{y}_1 + s_{1,4} \tilde{y}_2 \\ \sigma_1^2 V_4 - s_{1,4} \tilde{y}_1 - s_{1,3} \tilde{y}_2 \end{bmatrix} \quad (20)$$

where Q does not need to be explicitly computed. Also, the following can be noted:

$$\|q_3\|^2 = \sigma_1^2 [\sigma_1^2 \sigma_3^2 - (s_{1,3})^2 - (s_{2,3})^2] = \sigma_1^2 r_3, \quad (21)$$

and as a consequence of Equation (10), $\|q_3\|^2 = \|q_4\|^2$. From the above expressions, the minimization problem in Equation (2) becomes:

$$\hat{x} = \arg\min_x \|\tilde{y} - \tilde{R} x\|^2. \quad (22)$$

The noise vector $\tilde{N}_r$ has independent components but unequal variances, and the covariance matrix may be given by:

$$R_{\tilde{N}_r} = E[\tilde{N}_r \tilde{N}_r^T] = \frac{N_0}{2} \mathrm{diag}[\sigma_1^2, \sigma_1^2, \sigma_1^2 r_3, \sigma_1^2 r_3]. \quad (23)$$

Thus, the parameters needed in this triangularized model may be a function of eight variables. Four are functions of the channel only ($\sigma_1^2 = \|h_1\|^2$, $\sigma_2^2 = \|h_3\|^2$, $s_{1,3} = h_1^T h_3$, $s_{1,4} = h_1^T h_4$), and four are functions of the channel and observations ($V_1 = h_1^T y$, $V_2 = h_2^T y$, $V_3 = h_3^T y$, $V_4 = h_4^T y$).

The stage 206a of the algorithm involves demodulation of the received and pre-processed signal. More specifically, stage 206a involves the generation of hard-output values (as opposed to stage 206b, which involves the generation of soft-output values). After the pre-processing is done, a simplified ML demodulation is possible thanks to the properties of the matrix $\tilde{R}$ in Equation (18). The Euclidean metrics associated with Equation (17) and to be minimized to solve the problem in Equation (22) are:

$$T(x) = \frac{(\tilde{y}_1 - \sigma_1^2 x_1 - s_{1,3} x_3 - s_{1,4} x_4)^2}{\sigma_1^2} + \frac{(\tilde{y}_2 - \sigma_1^2 x_2 + s_{1,4} x_3 - s_{1,3} x_4)^2}{\sigma_1^2} + \frac{(\tilde{y}_3 - r_3 x_3)^2}{\sigma_1^2 r_3} + \frac{(\tilde{y}_4 - r_3 x_4)^2}{\sigma_1^2 r_3}. \quad (24)$$

A simplification of the search may be possible by noticing that the minimization problem in Equation (24) is actually a function of $x_3$ and $x_4$ only:

$$T(x) = \frac{(\tilde{y}_1 - \sigma_1^2 x_1 - C_1(x_3, x_4))^2}{\sigma_1^2} + \frac{(\tilde{y}_2 - \sigma_1^2 x_2 - C_2(x_3, x_4))^2}{\sigma_1^2} + C_3(x_3, x_4), \quad (25)$$

$$C_1(x_3, x_4) \geq 0.$$

This property is a direct consequence of the reordered lattice formulation in Equation (8). This means that for every candidate value for the couple $x_3, x_4$, the minimum value of T(x) is obtained from a simple quantization (or "slicing") operation of $(x_1, x_2)$ to the closest PAM value of the I and Q:

$$\hat{x}_1(x_3, x_4) = \mathrm{round}\left(\frac{\tilde{y}_1 - C_1(x_3, x_4)}{\sigma_1^2}\right), \quad (26)$$

$$\hat{x}_2(x_3, x_4) = \mathrm{round}\left(\frac{\tilde{y}_2 - C_2(x_3, x_4)}{\sigma_1^2}\right).$$

The resulting ML sequence estimate may then be determined as $\{\hat{x}_1(\hat{x}_3, \hat{x}_4), \hat{x}_2(\hat{x}_3, \hat{x}_4), \hat{x}_3, \hat{x}_4\}$, where:

$$\{\hat{x}_3, \hat{x}_4\} = \arg \min_{x_3, x_4 \in \Omega_x^2} T(\hat{x}_1(x_3, x_4), \hat{x}_2(x_3, x_4), x_3, x_4). \quad (27)$$

Here, $\Omega_x$ denotes the M-PAM constellation elements for each real dimension.

To summarize, the above technique allows, in case of MIMO systems with two transmit antennas and $M^2$-QAM constellations, achievement of the optimal ML solution with a low pre-processing complexity: namely $O(8R+3)$ real multipliers for the channel dependent terms and $O(8R+6)$ real multipliers for the receiver observation dependent terms. It also provides a reduced-complexity search of the order $O(M^2)$ (instead of $O(M^4)$ required by the exhaustive ML algorithm). In addition, it is suitable for a parallel hardware architecture.

It should be noted that the demodulation properties outlined above are still valid if R=1 (there is one receive antenna 108). In this case, the notable difference is that the bottom two rows of matrix $\tilde{R}$ in Equation (18) will be eliminated, but the same general form will hold for the remaining upper rows.

As shown in FIG. 2B, a similar technique can be used to generate bit soft-output. This can be described as follows: let $M_c$ represent the number of bits per QAM symbol, and $X_j$ (j=1, . . . , T) represent the QAM symbols in the transmitted sequence X. The (logarithmic) APP ratio of the bit $b_{k\ (k=1,\ \ldots,\ T\cdot M_c)}$ conditioned on the received channel symbol vector $\gamma$ is:

$$L(b_k \mid Y) = \ln \frac{P(b_k = 1 \mid Y)}{P(b_k = 0 \mid Y)} = \ln \frac{\sum_{X \in S^+} p(Y \mid X) p_a(X)}{\sum_{X \in S^-} p(Y \mid X) p_a(X)}. \quad (28)$$

where $S^+$ is the set of $2^{T \cdot Mc-1}$ bit sequences having $b_k=1$, and $S^-$ is the set of bit sequences having $b_k=0$. Also, $p_a(X)$ represents the a-priori probabilities of X. From Equation (1), $$p(Y \mid X) \propto \exp\left[-\frac{1}{2\sigma_N^2} \|Y - HX\|^2\right],$$

through a proportionality factor that can be neglected when substituted in Equation (28) and where $\sigma_N^2 = N_0/2$. The summation of exponentials involved in Equation (28) can be approximated according to the so-called "max-log" approximation:

$$\ln \sum_{X \in S^+} \exp[-D(X)] \cong \ln \max_{X \in S^+} \exp[-D(X)] = -\min_{X \in S^+} D(X) \quad (29)$$

where $D(X) = \|Y - HX\|^2$ is the ED term. Neglecting the a-priori probabilities, as for the common case when transmitted symbols are equiprobable, Equation (28) can be re-written using Equation (29) as:

$$L(b_k \mid Y) \cong \min_{X \in S^-} D(X) - \min_{X \in S^+} D(X). \quad (30)$$

In the following description, unless otherwise stated, Equation (30) is being referred to when dealing with the problem of bit APP generation.

This disclosure deals with this problem in the real-domain. Recall that $(x_{2j-1}, x_{2j})$ denotes the I and Q components of the complex symbol $X_j$. Consider the bits corresponding to the complex symbols $X_2 = (x_3, x_4)$ in the symbol sequence $X = (X_1, X_2)$. After the pre-processing in stage 204 is performed, from the equivalent system expression in Equation (17) and the metrics in Equation (24), the likelihood function can be given by:

$$p(\tilde{y} \mid x) = \exp[-T(x)] \quad (31)$$

The computation of Equation (30) requires finding two sequences for every bit, the most likely where $b_k=1$ and the most likely where $b_k=0$, for all k=1, . . . , $2M_c$. By definition, one of the two sequences is the optimum hard-decision ML solution of Equation (22).

Using arguments similar to those that led to the simplified ML demodulation in Equations (26) and (27), the max-log bit soft demapping of the bottom layer $(x_3, x_4)$ can be computed considering all possible $M^2$ values for $(x_3, x_4)$ and minimizing Equations (24) and (25) over $(x_1, x_2)$. In other words, for the QAM symbol $X_2$, it can be written as:

$$L(b_{2k} \mid \tilde{y}) \cong \min_{x_3, x_4 \in S(k)_2^-} T(\hat{x}_1(x_3, x_4), \hat{x}_2(x_3, x_4), x_3, x_4) - \min_{x_3, x_4 \in S(k)_2^+} T(\hat{x}_1(x_3, x_4), \hat{x}_2(x_3, x_4), x_3, x_4) \quad (32)$$

where $b_{2k}$ represents the bits belonging to (complex) symbols $X_2$ (k=1, . . . , $M_c$), and $S(k)_2^+$ and $S(k)_2^-$ represent the sets of $2^{(Mc-1)}$ bit sequences having $b_{2k}=1$ and $b_{2k}=0$, respectively. For every considered couple $(x_3, x_4)$, the minimization of the metrics required in Equation (32) can be performed using the expressions in Equation (26) for the corresponding values of $x_1, x_2$.

In order to compute optimal max-log LLR for symbol $X_1$ (whose I and Q components are $x_1, x_2$) and still keep a much lower complexity than ML, the algorithm performs all the former steps again but starts from the re-ordered I and Q sequence. In other words, $x' = [x_3, x_4, x_1, x_2]^T$ instead of the considered $x = [x_1, x_2, x_3, x_4]^T$, meaning the bottom layer is exchanged with the upper layer. This conceptually implies another orthogonalization process, meaning the processing of Equations (13)-(18) starts from the matrix:

$$Q = [h_3 \ h_4 \ q_1 \ q_2]. \quad (33)$$

However, the final results show that the amount of extra-complexity is very limited. Many coefficients turn out to be common to the already computed matrices and vectors. More specifically:

$$\tilde{y}' = \begin{bmatrix} v_3 \\ v_4 \\ \sigma_3^2 v_1 - s_{1,3} v_3 + s_{1,4} v_4 \\ \sigma_3^2 v_2 + s_{1,4} v_3 - s_{1,3} v_4 \end{bmatrix} \quad (34)$$

$$\tilde{R}' = \begin{bmatrix} \sigma_3^2 & 0 & s_{1,3} & -s_{1,4} \\ 0 & \sigma_3^2 & s_{1,4} & s_{1,3} \\ 0 & 0 & r_3 & 0 \\ 0 & 0 & 0 & r_3 \end{bmatrix}.$$

The ED metric derived from Equation (34) can then be given by:

$$T(x') = \|\tilde{y}' - \tilde{R}'x'\|^2 = \frac{(\tilde{y}'_1 - \sigma_3^2 x_3 - s_{1,3}x_1 + s_{1,4}x_2)^2}{\sigma_3^2} + \frac{(\tilde{y}'_2 - \sigma_3^2 x_4 - s_{1,4}x_1 - s_{1,3}x_2)^2}{\sigma_3^2} + \frac{(\tilde{y}'_3 - r_3 x_1)^2}{\sigma_3^2 r_3} + \frac{(\tilde{y}'_4 - r_3 x_2)^2}{\sigma_3^2 r_3}.$$ (35)

The max-log LLRs relative to symbol $X_1$ can be obtained searching for all $M^2$ cases for $x_1, x_2$ according to:

$$L(b_{1k} \mid \tilde{y}) \cong \min_{x_1, x_2 \in S(k)_1^-} T'(\hat{x}_3(x_1, x_2), \hat{x}_4(x_1, x_2), x_1, x_2) - \min_{x_1, x_2 \in S(k)_1^+} T'(\hat{x}_3(x_1, x_2), \hat{x}_4(x_1, x_2), x_1, x_2)$$ (36)

where $b_{1k}$ represent the bits belonging to symbol $X_1$ ($k=0, \ldots, M_c-1$), and $S(k)_1^+$ and $S(0_1^-$ represent the sets of $2^{(M_c-1)}$ bit sequences having $b_{1k}=1$ and $b_{1k}=0$, respectively.

In this way, an exact bit max-log APP computation is possible using two layer orderings (having a low amount of extra-complexity) and a parallel search over $2M^2$ sequences instead of $M^4$ as for the optimum ML (the exponential dependency upon the number of transmit antennas 106 becomes linear but with no performance degradation). It will be understood that the max-log LLR derivation described above is just one computationally efficient method to generate LLRs. Other methods can be implemented without going beyond the scope of this disclosure. These other methods could include the computation of the exponential summation in Equation (28) using the same $2M^2$ sequences derived as explained above for the max-log LLR computation (this can be done in either the additive or the logarithmical domain).

The Gram-Schmidt Orthogonalization process described above in stage 204 can also be implemented in a different way. The columns of the matrix Q can be normalized so that an orthonormal (instead of orthogonal) matrix Q is computed during stage 204. Often, normalizations require divisions to be computed as part of the channel processing stage while avoiding the performance of noise variance equalizations (i.e. denominators) in the ED computations of Equations (24) and (35). In general, this implies a very high complexity saving for both hard- and soft-output demodulation. Also, in the case of soft-output generation, as outlined above, it is possible to save complexity if no explicit computation of Q is performed but are $\tilde{y}, \tilde{y}'$ are directly computed. Here, $\beta_{2k-1}^2 \equiv \|q'_{2k-1}\|^2$, $s'_{2j-1,k} \equiv s_{2j-1,k}/\sigma_{2j-1}$, $s'_{2j,k} \equiv s_{2j,k}/\sigma_{2j-1}$, where $q'_{2k-1}$ represents the un-normalized Q columns. If T=2 (there are two transmit antennas 106) and R≥2 (there are two or more receive antennas 108), this embodiment may correspond to computing a 2Rx4 matrix:

$Q = [h_1 \ h_2 \ q_3 \ q_4]$ (37)

where:

$q'_3 = h_3 - (s_{1,3}h_1)/\sigma_1^2 - (s_{2,3}h_2)/\sigma_1^2 \quad q_3 = q'_3/\|q'_3\|$ $q'_4 = h_4 + (s_{2,3}h_1)/\sigma_1^2 - (s_{1,3}h_2)/\sigma_1^2 \quad q_4 = q'_4/\|q'_4\|$ (38)

and:

$\beta_3^2 = \|q'_3\|^2 = \|q'_4\|^2 = \sigma_3^2 - s'_{1,3}^2 - s'_{2,3}^2.$ (39)

There is also a 4×4 triangular matrix R such that $H_r = QR$:

$$R = \begin{bmatrix} \sigma_1 & 0 & s'_{1,3} & s'_{1,4} \\ 0 & \sigma_1 & -s'_{1,4} & s'_{1,3} \\ 0 & 0 & \beta_3 & 0 \\ 0 & 0 & 0 & \beta_3 \end{bmatrix}.$$ (40)

The noise vector $\tilde{N}_r$ obtained from Equation (17) has independent components and equal variances. Equation (20) can then be replaced by:

$$\tilde{y} = \begin{bmatrix} \tilde{y}_1 \\ \tilde{y}_2 \\ \tilde{y}_3 \\ \tilde{y}_4 \end{bmatrix} = \begin{bmatrix} V_1/\sigma_1 \\ V_2/\sigma_1 \\ [V_3 - s'_{1,3}\tilde{y}_1 - s'_{2,3}\tilde{y}_2]/\beta_3 \\ [V_4 + s'_{2,3}\tilde{y}_1 - s'_{1,3}\tilde{y}_2]/\beta_3 \end{bmatrix}.$$ (41)

The computation of Equations (40) and (41) may be sufficient to perform the optimal hard-output demodulation, specifically:

$$\hat{x} = \arg \min_{x_1, x_2 \in \Omega_x^2} \|\tilde{y} - Rx\|^2.$$ (42)

The ED $T(x) = \|\tilde{y} - Rx\|^2$ corresponds to an alternate expression than in Equation (24), where no different denominators exist, thus entailing a significant complexity saving.

For bit soft-output generation during stage 206b in FIG. 2B, the Gram-Schmidt Orthogonalization may be computed for a MIMO model with shifted antenna order $x' = [x_3, x_4, x_1, x_2]^T$:

$Q_s = [h_3 \ h_4 \ q_1 \ q_2]$ $q'_1 = h_1 - (s_{1,3}h_3)/\sigma_3^2 - (s_{2,3}h_4)/\sigma_3^2 \quad q_1 = q'_1/\|q'_1\|$ $q'_2 = h_2 + (s_{2,3}h_3)/\sigma_3^2 - (s_{1,3}h_4)/\sigma_3^2 \quad q_2 = q'_2/\|q'_2\|$ $\beta'_1{}^2 = \|q'_1\|^2 = \|q'_2\|^2 = \sigma_1^2 - s_{1,3}^2/\sigma_3^2 - s_{2,3}^2/\sigma_3^2,$ (43)

resulting in:

$$\tilde{y}' = \begin{bmatrix} V_3/\sigma_3 \\ V_4/\sigma_3 \\ [V_1 - (s_{1,3}V_3)/\sigma_3^2 + (s_{2,3}V_4)/\sigma_3^2]/\beta'_1 \\ [V_4 - (s_{2,3}V_3)/\sigma_3^2 - (s_{1,3}V_4)/\sigma_3^2]/\beta'_1 \end{bmatrix}$$ (44)

$$R' = \begin{bmatrix} \sigma_3 & 0 & s_{1,3}/\sigma_3 & -s_{1,4}/\sigma_3 \\ 0 & \sigma_3 & s_{1,4}/\sigma_3 & s_{1,3}/\sigma_3 \\ 0 & 0 & \beta'_1 & 0 \\ 0 & 0 & 0 & \beta'_1 \end{bmatrix}.$$

The resulting ED term is $T'(x') = \|\tilde{y}' - R'x'\|^2$. The bit LLRs can be determined as:

$$L(b_{2k} \mid \tilde{y}) = \min_{x_3, x_4 \in S(k)_2^-} T(x) - \min_{x_3, x_4 \in S(k)_2^+} T(x)$$ (45)

and $$L(b_{1k} \mid \tilde{y}') = \min_{x_1, x_2 \in S(k)_1^-} T'(x') - \min_{x_1, x_2 \in S(k)_1^+} T'(x'). \qquad (46)$$

The above described algorithm has been described with respect to two transmit antennas 106. As shown in the following description, the algorithm can be generalized to any number of transmit antennas 106. While two possible embodiments are described below, different matrix processing may be applied to $H_r$ without departing from the scope of this disclosure, such as standard QR (which can be accomplished in several ways well known to those skilled in the art) or Cholesky decomposition algorithms.

With T transmit antennas (where T≥2), the pre-processing during stage 204 may occur as follows. General closed expressions are used for the elements of the matrices Q and $\tilde{R}$ for a MIMO system with any number of T antennas 106 (T≥2) and R≥T receive antennas 108. A real orthogonal matrix Q can be defined as:

$$Q = [h_1 \; h_2 \; q_3 \; q_4 \ldots q_{2k+1} \; q_{2k+2} \ldots q_{2T-1} \; q_{2T}]. \qquad (47)$$

Here:

$$q_1 = h_1 \qquad (48)$$
$$q_2 = h_2$$
$$q_3 = \sigma_1^2 h_3 - s_{1,3} h_1 - s_{2,3} h_2$$
$$q_4 = \sigma_1^2 h_4 - s_{1,4} h_1 - s_{2,4} h_2$$
$$q_5 = r_3 \sigma_1^2 h_5 - r_3 s_{1,5} h_1 - r_3 s_{2,5} h_2 - t_{3,5} q_3 - t_{4,5} q_4$$
$$\vdots$$
$$q_p = P_1^k (\sigma_1^2 h_p - s_{1,p} h_1 - s_{2,p} h_2) -$$
$$\sum_{i=2}^{k-1} [P_{i+1}^k (t_{2i-1,p} q_{2i-1} + t_{2i,p} q_{2i})] - t_{2k-1,p} q_{2k-1} - t_{2k,p} q_{2k}$$

where p denotes the generic $k^{th}$ pair of q columns (p={2k+1, 2k+2}, with k={2, ..., T−1}). This also uses the definitions $t_{j,k} = q_j^T h_k$, $$P_m^n \equiv \prod_{j=m}^{n} r_{2j-1},$$

where m and n are integers with 1≤m≤n. The terms $r_{2k-1}$, with k={1, ..., T}, may be given by:

$$r_1 = 1 \qquad (48)$$
$$r_3 = \sigma_3^2 \sigma_1^2 - s_{1,3}^2 - s_{2,3}^2$$
$$\vdots$$
$$r_{2k-1} = P_2^{k-1} (\sigma_1^2 \sigma_{2k-1}^2 - s_{1,2k-1}^2 - s_{2,2k-1}^2) -$$
$$\sum_{i=2}^{k-2} [P_{i+1}^{k-1} (t_{2i-1,2k-1}^2 + t_{2i,2k-1}^2)] - t_{2k-3,2k-1}^2 - t_{2k-2,2k-1}^2$$

Equation (1) can be generalized as:

$$\|q_{2k-1}\|^2 = \|q_{2k}\|^2 = P_1^k \sigma_1^2$$
$$q_{2k-1}^T h_{2j-1} = q_{2k}^T h_{2j}, \; q_{2k-1}^T h_{2j} = -q_{2k}^T h_{2j-1}, j > k. \qquad (50)$$

Also, by construction, the q vectors and {q,h} couples are pairwise orthogonal, meaning $q_{2k-1}^T q_{2k} 0$, $q_{2k-1}^T h_{2k} = 0$. The generalization of Equations (15)-(18) from T=2 to any number of transmit antennas 106 is straightforward. For example, the orthogonal matrix Q may satisfy the following:

$$Q^T Q = \text{diag}[\sigma_1^2, \sigma_1^2, \|q_3\|^2, \|q_3\|^2, \ldots \|q_{2T-1}\|^2, \|q_{2T-1}\|^2]. \qquad (51)$$

By defining the following 2Tx2T upper triangular matrix:

$$R = \begin{bmatrix} 1 & 0 & s_{1,3} & s_{1,4} & r_3 s_{1,5} & \ldots & \ldots & \ldots & P_1^{T-1} s_{1,2T-1} & P_1^{T-1} s_{1,2T} \\ 0 & 1 & -s_{1,4} & s_{1,3} & r_3 s_{2,5} & \ldots & \ldots & \ldots & -P_1^{T-1} s_{1,2T} & P_1^{T-1} s_{1,2T-1} \\ 0 & 0 & 1 & 0 & t_{3,5} & \ldots & \ldots & \ldots & P_2^{T-1} t_{3,2T-1} & P_2^{T-1} t_{3,2T} \\ 0 & 0 & 0 & 1 & -t_{3,6} & \ldots & \ldots & \ldots & -P_2^{T-1} t_{3,2T} & P_2^{T-1} t_{3,2T-1} \\ \ldots & \ldots & \ldots & \ldots & \ldots & \ldots & \ldots & \ldots & \ldots & \ldots \\ 0 & 0 & 0 & 0 & 0 & \ldots & 1 & 0 & t_{2T-3,2T-1} & t_{2T-3,2T} \\ 0 & 0 & 0 & 0 & 0 & \ldots & 0 & 1 & -t_{2T-3,2T} & t_{2T-3,2T-1} \\ 0 & 0 & 0 & 0 & 0 & \ldots & 0 & 0 & 1 & 0 \\ 0 & 0 & 0 & 0 & 0 & \ldots & 0 & 0 & 0 & 1 \end{bmatrix} \qquad (52)$$

the real channel matrix $H_r$ can be decomposed in the product:

$$H_r = Q R \Lambda_q \qquad (53)$$

where the 2Tx2T diagonal matrix:

$$\Lambda_q = \text{diag}[1, 1, \sigma_1^{-2}, \sigma_1^{-2}, \ldots (P_1^{T-1} \sigma_1^2)^{-1}] \qquad (54)$$

includes normalization factors since Q is not orthonormal. As Equation (17) can still be applied, it may be sufficient to compute the triangular matrix:

$$\tilde{R} = Q^T Q R \Lambda_q = \begin{bmatrix} \sigma_1^2 & 0 & s_{1,3} & s_{1,4} & s_{1,5} & \ldots & \ldots & s_{1,2T-1} & s_{1,2T} \\ 0 & \sigma_1^2 & -s_{1,4} & s_{1,3} & -s_{1,6} & \ldots & \ldots & -s_{1,2T} & s_{1,2T-1} \\ 0 & 0 & r_3 & 0 & t_{3,5} & \ldots & \ldots & t_{3,2T-1} & t_{3,2T} \\ 0 & 0 & 0 & r_3 & -t_{3,6} & \ldots & \ldots & -t_{3,2T} & t_{3,2T-1} \\ \ldots & \ldots & \ldots & \ldots & \ldots & \ldots & \ldots & \ldots & \ldots \\ 0 & 0 & 0 & 0 & 0 & \ldots & r_{2T-3} & 0 & t_{2T-3,2T-1} & t_{2T-3,2T} \\ 0 & 0 & 0 & 0 & 0 & \ldots & 0 & r_{2T-3} & -t_{2T-3,2T} & t_{2T-3,2T-1} \\ 0 & 0 & 0 & 0 & 0 & \ldots & 0 & 0 & r_{2T-1} & 0 \\ 0 & 0 & 0 & 0 & 0 & \ldots & 0 & 0 & 0 & r_{2T-1} \end{bmatrix}. \qquad (55)$$

The noise vector $\tilde{N}_r$ obtained from Equation (17) has independent components but equal variances given by:

$$R_{\tilde{N}_r} = E[\tilde{N}_r \tilde{N}_r^T] = \frac{N_0}{2} \text{diag}[\sigma_1^2, \sigma_1^2, \ldots, P_1^T \sigma_1^2, P_1^T \sigma_1^2]. \quad (56)$$

With T transmit antennas 106, the demodulation during stage 206a may occur as follows. Once the pre-processing described by the above formulas is completed, from the observation model in Equation (17), a simplified demodulation is possible. Using the structure of $\tilde{R}$ in Equation (55), the decision metrics $T(x) = \|\tilde{y} - \tilde{R}x\|^2$ can be written as:

$$T(x) = \frac{\left(\tilde{y}_1 - \sigma_1^2 x_1 - \sum_{k=3}^{2T} s_{1,k} x_k\right)^2}{\sigma_1^2} + \frac{\left(\tilde{y}_2 - \sigma_1^2 x_2 - \sum_{k=3}^{2T} s_{2,k} x_k\right)^2}{\sigma_1^2} + \frac{\left(\tilde{y}_3 - r_3 x_3 - \sum_{k=5}^{2T} t_{3,k} x_k\right)^2}{\sigma_1^2 r_3} + \ldots + \frac{(\tilde{y}_{2T-1} - r_{2T-1} x_{2T-1})^2 + (\tilde{y}_{2T} - r_{2T-1} x_{2T})^2}{\sigma_1^2 P_2^{T-1}}. \quad (57)$$

One demodulation technique includes considering all $M^2$ values for the I and Q couples of the lowest level layer. For each hypothesized value of $x_{2T-1}$ and $x_{2T}$ (here denoted $\tilde{x}_{2T-1}$ and $\tilde{x}_{2T}$), the higher-level layers are decoded through interference nulling and cancelling or ZF-DFE. The estimation of the I and Q couples of the remaining T-1 complex symbols can be implemented through a slicing operation to the closest M-PAM elements of $\Omega_x$ (for $x_1, \ldots, x_{2T-2}$), in analogy to Equation (26). To better exemplify the steps, the following may be expressed:

$$T(x) = \frac{(\tilde{y}_1 - \sigma_1^2 x_1 - C_1(x_3, \ldots x_{2T}))^2}{\sigma_1^2} + \frac{(\tilde{y}_2 - \sigma_1^2 x_2 - C_2(x_3, \ldots x_{2T}))^2}{\sigma_1^2} + \frac{(\tilde{y}_3 - r_3 x_3 - C_3(x_5, \ldots x_{2T}))^2}{\sigma_1^2 r_3} + \ldots + C_{2T-1}(x_{2T-1}, x_{2T}) \quad (58)$$

where:

$$C_{2T-1}(x_{2T-1}, x_{2T}) = \frac{(\tilde{y}_{2T-1} - r_{2T-1} x_{2T-1})^2 + (\tilde{y}_{2T} - r_{2T-1} x_{2T})^2}{\sigma_1^2 P_2^{T-1}}. \quad (59)$$

The conditional decoded values of $x_1, \ldots, x_{2T-2}$ may be determined recursively as:

$$\hat{x}_{2T-2} = \text{round}\left(\frac{\tilde{y}_{2T-2} - C_{2T-2}(\tilde{x}_{2T-1}, \tilde{x}_{2T})}{r_{2T-3}}\right) \quad (60)$$

$$\vdots$$

$$\hat{x}_1 = \text{round}\left(\frac{\tilde{y}_1 - C_1(\hat{x}_3, \ldots, \hat{x}_{2T-2}, \tilde{x}_{2T-1}, \tilde{x}_{2T})}{\sigma_1^2}\right).$$

Denoting these 2T-2 conditional decisions as $\hat{x}_{1,2T-2}(\tilde{x}_{2T-1}, \tilde{x}_{2T})$, the resulting estimated sequence may then be determined as:

$$\hat{x} = \{\hat{x}_{1,2T-2}(\tilde{x}_{2T-1}, \tilde{x}_{2T}), \tilde{x}_{2T-1}, \tilde{x}_{2T}\} \quad (61)$$

where:

$$\{\hat{x}_{2T-1}, \hat{x}_{2T}\} = \arg\min_{\tilde{x}_{2T-1}, \tilde{x}_{2T} \in \Omega_x^2} T[\hat{x}_{1,2T-2}(\tilde{x}_{2T-1}, \tilde{x}_{2T}), \tilde{x}_{2T-1}, \tilde{x}_{2T}]. \quad (62)$$

An explanation of the demodulation principle illustrated above is as follows. Each group of two rows of $\tilde{R}$ in Equation (55) corresponds to a transmit antenna 106. Layer correspondence with the rows of $\tilde{R}$ is enumerated in this document from top to bottom. The search for the I and Q couples of the $T^{th}$ transmit antenna 106 can be carried out independently. As a further consequence of $\tilde{R}$, looking at Equation (60), the partial Euclidean distance ("PED") terms corresponding to the I and Q couple $(x_{2k-1}, x_{2k})$ are independent from each other. Thus, one approximation involves taking a hard decision (through the mentioned slicing or by rounding to the closest PAM level) at every level k based on the value of the I and Q couples of the lower layers only. This is a direct consequence of the lattice formulation in Equation (8) and would not be true for the lattice formulation in Equation (3). In conclusion, in the case of hard-output demodulation (stage 206a), the algorithm uses $M^2$ transmit sequences instead of $M^{2T}$ (as in the optimal ML detection). The saving in complexity is therefore quite large.

It should be noted that the demodulation properties outlined above are still valid if R=T-1 (the number of receive antennas 108 is equal to the number of transmit antennas 106 minus one). In this case, the notable difference is that the bottom two rows of matrix $\tilde{R}$ in Equation (55) will be eliminated, but the same general form will hold for the remaining upper rows.

It will be understood that other embodiments of the demodulation in stage 206a may be adopted without departing from the scope of this disclosure. For example, optimal ML demodulation can be achieved by slicing only the upper layer $(x_1, x_2)$ over all possible $M^{2T-2}$ values of the PEDs corresponding to the other lower real components $(x_3, \ldots, x_{2T})$. Also, as another example, any other intermediate case can be implemented resulting in an intermediate complexity and performance between that of the least performing, least complex case (search of $M^2$ symbols for the reference bottom layer) and that of the optimal most complex, most performing case (search of $M^{2T-2}$ symbols for the reference T-1 lower level layers). These include, but are not limited to, any of the T-2 cases where a number j of bottom layers in the triangularized model (where $2 \leq j \leq T-1$) is subject of an exhaustive search in the minimization of $T(x) = \|\tilde{y} - \tilde{R}x\|^2$. This may correspond to calculating all $M^{2j}$ possible PEDs for the j lower layers and taking a hard decision (or slicing or rounding) for the remaining T-j layers based on the value assigned to the reference layers during the lattice search.

During stage 206a, the specific ordering of the layers may have important implications on the detector's performance. One example ordering technique is described below. From the point of view of the demodulation occurring during stage 206a, however, any permutation of the natural layer ordering sequence $\{1, 2, \ldots T\}$ is encompassed by this disclosure.

With T transmit antennas (where $T \geq 2$), in the demodulation stage 206b, the generation of the bit soft-output information may be done by approximating the bit LLR max-log computation through the use of the simplified demodulation method of Equations (60)-(62). This means that, relative to the bits belonging to symbol $X_T$ in the sequence $X = (X_1, \ldots, X_T)$, Equation (30) can be approximated as:

$$L(b_{T,k} \mid \tilde{y}) = \min_{\{\tilde{x}_{2T-1}, \tilde{x}_{2T}\} \in S(k)_T^-} T[\hat{x}_{1,2T-2}(\tilde{x}_{2T-1}, \tilde{x}_{2T}), \tilde{x}_{2T-1}, \tilde{x}_{2T}] - \quad (63)$$

$$\min_{\{\tilde{x}_{2T-1}, \tilde{x}_{2T}\} \in S(k)_T^+} T[\hat{x}_{1,2T-2}(\tilde{x}_{2T-1}, \tilde{x}_{2T}), \tilde{x}_{2T-1}, \tilde{x}_{2T}]$$

where $\hat{x}_{1,2T-2}(\tilde{x}_{2T-1}, \tilde{x}_{2T})$ denotes the 2T−2 conditional decisions in Equation (60), $b_{T,k}$ are the bits belonging to symbol $X_T$ (k=1, . . . , $M_c$), and $S(k)_T^+$ and $S(k)_T^-$ represent the sets of $2^{(Mc-1)}$ bit sequences having $b_{T,k}$=1 and $b_{T,k}$=0, respectively.

In order to compute the approximated max-log LLRs for the bits corresponding to the other T−1 symbols in X, the algorithm computes the steps formerly described for the other T−1 different layer dispositions (for a total of T permutations), where in turn each layer becomes the reference layer only once. This means that the last two rows of the $\tilde{R}$ matrix correspond, in turn, to every symbol in the vector symbol X. The columns of the real channel matrix $H_r$ are permuted accordingly prior to performing the Gram-Schmidt Orthogonalization.

The index permutations can be optimized by recalling that, by applying the Gram-Schmidt Orthogonalization, the QR computes the matrix R line by line from top to bottom and the matrix Q columnwise from left to right. This suggests that, in order to minimize the complexity, the considered permutations may differ for the least possible number of indexes, especially for the first layers. For instance, if the first layer changes, another complete QR may need to be computed. As the first layer in the original permutation needs to be moved at the last position once, in order to compute the related APPs, this implies that the overall processing complexity may be equal to two full Gram-Schmidt Orthogonalizations, plus the extra terms related to the intermediate layer shifting.

In all of these cases, the core of the processing for the scalar products between 2R-element vectors involving the (real) channel columns can be computed only once. While this property is true if GSO is selected as proposed in this embodiment, it might not be true if other methods were selected, such as the modified-GSO ("MGSO") technique. However, this possibility is important to save complexity, and different triangularization methods such as the Cholesky decomposition or the MGSO may not impair the performance of this technique. Given the above reported criteria, an efficient set for APP computation can be generated as follows. Start from two initial permutations (cases a and b) and exchange the last element with each one of the T/2 second half elements, such as by:

1) If T is an even number:
   a) $\pi_1$=1, 2, . . . T; $\pi_2$=1, 2, . . . T−2, T, T−1; . . . ; $\pi_{T/2}$=1, 2, . . . T/2, T/2+2, T/2+3, . . . T/2+1
   b) $\pi_{T/2+1}$=T/2+1, T/2+2, . . . T, 1, 2, . . . T/2; $\pi_{T/2+2}$=T/2+1, T/2+2, . . . T, 1, 2, . . . T/2−2, T/2, T/2−1; . . . ; $\pi_T$=T/2+1, T/2+2, . . . T, 2, 3, . . . T/2, 1

2) If T is an odd number:
   a) $\pi_1$=1, 2, . . . T; $\pi_2$=1, 2, . . . T−2, T, T−1; . . . ; $\pi_{\lceil T/2 \rceil}$=1, 2, . . . $\lfloor T/2 \rfloor$, $\lfloor T/2 \rfloor$+2, $\lfloor T/2 \rfloor$+3, . . . $\lfloor T/2 \rfloor$+1
   b) $\pi_{\lceil T/2 \rceil+1}$=$\lfloor T/2 \rfloor$+1, $\lfloor T/2 \rfloor$+2, . . . T, 1, 2, . . . $\lfloor T/2 \rfloor$; $\pi_{\lceil T/2 \rceil+2}$=$\lfloor T/2 \rfloor$+1, $\lfloor T/2 \rfloor$+2, . . . T, 1, 2, . . . $\lfloor T/2 \rfloor$−2, $\lfloor T/2 \rfloor$, $\lfloor T/2 \rfloor$−1; . . . ; $\pi_T$=$\lfloor T/2 \rfloor$+1, $\lfloor T/2 \rfloor$+2, . . . T, 2, 3, . . . $\lfloor T/2 \rfloor$, 1.

However, any other set of T permutations can be used, provided that each layer in turn is placed as the last entry in the T layer sets $\pi_j$.

As another example, a straightforward set of layer permutations is given by:

$\pi_T = 1, \ldots T$ $\pi_{T-1} = 1, \ldots T-2, T, T-1$ $\pi_{T-2} = 1, \ldots T-1, T, T-2$ $\vdots$ $\pi_1 = 2, 3, \ldots T, 1.$ Here, let $\Pi_j$ indicate a 2Tx2T permutation matrix that disposes the columns of $H_r$ according to the index set $\pi_j$, $j \in \{1, \ldots T\}$. Equations (53)-(55) can be generalized as follows. The QR decomposition of the permuted real channel matrix can be written as:

$$H_r \Pi_j = Q^{(j)} R^{(j)} \Lambda_q^{(j)} \quad (64)$$

where $\tilde{R}^{(j)} = Q^{(j)T} Q^{(j)} R^{(j)} \Lambda_q^{(j)}$. Also, the pre-processed system Equation (17) becomes:

$$\tilde{y}^{(j)} = Q^{(j)T} y = \tilde{R}^{(j)} x^{(j)} + Q^{(j)T} N_r = \tilde{R}^{(j)} x^{(j)} + \tilde{N}_r^{(j)} \quad (65)$$

where $x_{\pi_j}$ is the permuted I and Q sequence. From Equation (65), the ED metric can be written as:

$$T^{(j)}(x^{(j)}) = \|\tilde{y}^{(j)} - \tilde{R}^{(j)} x_{\pi_j}\|^2 \quad (66)$$

and the approximated max-log bit LLR in Equation (63) becomes:

$$L(b_{j,k} \mid \tilde{y}^{(j)}) = \min_{\{\tilde{x}_{2j-1}, \tilde{x}_{2j}\} \in S(k)_j^-} T^{(j)}[\hat{x}_{\pi_j}(\tilde{x}_{2j-1}, \tilde{x}_{2j}), \tilde{x}_{2j-1}, \tilde{x}_{2j}] - \quad (67)$$

$$\min_{\{\tilde{x}_{2j-1}, \tilde{x}_{2j}\} \in S(k)_j^+} T^{(j)}[\hat{x}_{\pi_j}(\tilde{x}_{2j-1}, \tilde{x}_{2j}), \tilde{x}_{2j-1}, \tilde{x}_{2j}]$$

where $\hat{x}_{90_j}(\tilde{x}_{2j-1}, \tilde{x}_{2j})$ denotes the 2T−2 conditional decisions of the layer order sequence specified $\pi_j$ in the DFE process (in analogy to Equations (60)-(62)), starting from the bottom layer ($x_{2j-1}, x_{2j}$). Also, $b_{j,k}$ represents the bits corresponding to $X_j$ (k=1, . . . , $M_c$), and $S(k)_j^+$ and $S(k)_j^-$ represents the sets of $2^{(Mc-1)}$ bit sequences having $b_{j,k}$=1 and $b_{j,k}$=0, respectively.

This technique allows the generation of approximated max-log LLRs relying on a lattice search of $TM^2$ symbol sequences, as opposed to a search of $M^{2T}$ symbol sequences as required by an exhaustive search maximum a-posteriori probability (MAP) demodulator. Also, the bit soft-output information can be computed in a parallel fashion.

It will be understood that the max-log LLR derivation described above is just one computationally efficient method to generate bit soft-output information. Others can be implemented without going beyond the scope of this disclosure. These include, but are not limited to, the computation of the exponential summation in Equation (28) using the same $TM^2$ sequences derived as explained above for the max-log LLR computation (this can done in either the additive or logarithmical domain). Also, an alternative technique for LLR computation includes a modification of Equation (67) that is able to provide a significant performance improvement in some scenarios. The LLR computation for the layer j can be carried out through:

$$L(b_{j,k} \mid \tilde{y}^{(j)}) \cong \quad (68)$$

$$\min\left(\min_{\{\tilde{x}_{2j-1}, \tilde{x}_{2j}\} \in S(k)_j^-} T^{(j)}, L\right) - \min\left(\min_{\{\tilde{x}_{2j-1}, \tilde{x}_{2j}\} \in S(k)_j^+} T^{(j)}, L\right)$$

where L is a constant threshold whose optimal value depends on system parameters (channel conditions, constellation size, code rate, etc.). In other words, the minimization of the two ED terms is performed as exemplified with Equation (67) if the resulting term is also inferior to the threshold L. Intuitively, this limits the unreliability of the LLRs for suboptimal detection systems. Setting a threshold for the LLR calculations could allow for the achievement of near ML performance, although this effectiveness may exist only for MIMO systems with T>2.

Instead of the Gram-Schmidt Orthogonalization process described above during stage 204, the columns of the matrix Q can be normalized so that an orthonormal (instead of orthogonal) matrix Q is computed. Often, normalizations require divisions to be computed as part of the channel processing stage while avoiding the performance of noise variance equalizations (i.e. denominators) in the ED computations of Equations (57) and (66). In general, this implies a very high complexity saving for both hard- and soft-output demodulation. Also, in the case of soft-output generation, it is possible to save complexity if no explicit computation of Q is performed, but instead both the entries of R ($t_{j,k} \equiv q_j^T h_k$) and the processed received sequences $\tilde{y}_k$ (k being the index of the complex symbol of which bit LLRs are being computed) are directly computed. For example, there is a real orthonormal matrix Q:

$$Q = [h_1 \; h_2 \; q_3 \; q_4 \; \ldots \; q_{2k+1} \; q_{2k+2} \; \ldots \; q_{2T-1} \; q_{2T}] \quad (69)$$

where:

$$q'_1 = h_1 \quad (70)$$
$$q'_2 = h_2$$
$$q'_3 = h_3 - (s_{1,3} h_1)/\sigma_1^2 - (s_{2,3} h_2)/\sigma_1^2$$
$$q'_4 = h_4 + (s_{2,3} h_1)/\sigma_1^2 - (s_{1,3} h_2)/\sigma_1^2$$
$$q'_5 = h_5 - (s_{1,5} h_1)/\sigma_1^2 - (s_{2,5} h_2)/\sigma_1^2 - (t_{3,5} q'_3)/\beta_3^2 - (t_{4,5} q'_4)/\beta_3^2$$
$$\vdots$$
$$q'_p = h_p - (s_{1,p} h_1)/\sigma_1^2 - (s_{2,p} h_2)/\sigma_1^2 - \sum_{i=2}^{k-1} (t_{2i-1,p} q'_{2i-1} + t_{2i,p} q'_{2i})/\beta_{2i-1}^2$$

$$q_{2k-1} = q'_{2k-1}/\beta_{2k-1}.$$

Here, p denotes the generic $k^{th}$ pair of Q columns (such as p={2k−1, 2k}, with k={2, . . . , T}), and:

$$\beta_{2k-1}^2 = \|q'_{2k-1}\|^2 \quad (71)$$

$$= \|q'_{2k}\|^2$$

$$= \sigma_{2k-1}^2 - (s_{1,2k-1}^2 - s_{2,2k-1}^2)/\sigma_1^2 - \sum_{i=2}^{k-1} (t_{2i-1,2k-1}^2 - t_{2i,2k-1}^2)/\beta_{2i-1}^2.$$

Q does not need to be explicitly computed here. Instead, the 2R-element scalar products $t_{j,k} \equiv q_j^T h_k$ can be computed directly once values for $s_{jk}$ are stored. This may be useful to save complexity, as LLR generation requires T repeated GSO processing for different orderings of the transmit sequence. In this way, the core of the operations (the 2R-element scalar products) can be re-used for all of them. This property is true if GSO is selected as proposed in this embodiment, although it may not be true if other methods were selected, such as MGSO. This possibility is important to save complexity, and different triangularization methods such as the Cholesky decomposition or the MGSO may not impair the performance of this technique. More specifically, the terms $t_{j,k}$ can be given by:

$$t_{3,j} = s_{3,j} - s'_{1,3} s'_{1,j} - s'_{2,3} s'_{2,j}; \; t'_{3,j} = t_{3,j}/\beta_3 \quad (72)$$

$$t_{4,2j-1} = -t_{3,2j}, \; t_{4,2j} = t_{3,2j-1}; \; t'_{4,j} = t_{4,j}/\beta_3$$

$$t_{5,j} = s_{5,j} - s'_{1,5} s'_{1,j} - s'_{2,5} s'_{2,j} - t'_{3,5} t'_{3,j} - t'_{4,5} t'_{4,j}$$

$$\vdots$$

$$t_{2k-1,j} = s_{2k-1,j} - s'_{1,2k-1} s'_{1,j} -$$
$$s'_{2,2k-1} s'_{2,j} - \sum_{i=2}^{k-1} (t'_{2i-1,2k-1} t'_{2i-1,j} + t'_{2i,2k-1} t'_{2i,j})$$

$$t_{2k,2j-1} = -t_{2k-1,2j}, \; t_{2k,2j} = t_{2k-1,2j-1},$$

$$t'_{2k-1,j} = t_{2k-1,j}/\beta_{2k-1}, \; t'_{2k,j} = t_{2k,j}/\beta_{2k-1}.$$

The 2Tx2T triangular matrix R such that $H_r = QR$ can be given by:

$$R = \begin{bmatrix} \sigma_1 & 0 & s'_{1,3} & s'_{1,4} & s'_{1,5} & \ldots & \ldots & \ldots & s'_{1,2T-1} & s'_{1,2T} \\ 0 & \sigma_1 & -s'_{1,4} & s'_{1,3} & -s'_{1,6} & \ldots & \ldots & \ldots & -s'_{1,2T} & s'_{1,2T-1} \\ 0 & 0 & \beta_3 & 0 & t'_{3,5} & \ldots & \ldots & \ldots & t'_{3,2T-1} & t'_{3,2T} \\ 0 & 0 & 0 & \beta_3 & -t'_{3,6} & \ldots & \ldots & \ldots & -t'_{3,2T} & t'_{3,2T-1} \\ \ldots & \ldots & \ldots & \ldots & \ldots & \ldots & \ldots & \ldots & \ldots & \ldots \\ 0 & 0 & 0 & 0 & 0 & \ldots & \beta_{2T-3} & 0 & t'_{2T-3,2T-1} & t'_{2T-3,2T} \\ 0 & 0 & 0 & 0 & 0 & \ldots & 0 & \beta_{2T-3} & -t'_{2T-3,2T} & t'_{2T-3,2T-1} \\ 0 & 0 & 0 & 0 & 0 & \ldots & 0 & 0 & \beta_{2T-1} & 0 \\ 0 & 0 & 0 & 0 & 0 & \ldots & 0 & 0 & 0 & \beta_{2T-1} \end{bmatrix}. \quad (73)$$

The noise vector $\tilde{N}_r$ obtained from Equation (17) has independent components and equal variances. In order to save complexity when T GSO processings have to be performed:

$$\tilde{y} = Q^T y = Rx + Q^T N_r = Rx + \tilde{N}_r \quad (74)$$

can be decomposed using Equation (70) and the already computed scalar products $V_k$ and $s_{jk}, t_{jk}$. $\tilde{y}$ can be re-written as:

$$\tilde{y} = \begin{bmatrix} \tilde{y}_1 \\ \tilde{y}_2 \\ \vdots \\ \vdots \\ \vdots \\ \tilde{y}_{2k} \end{bmatrix}$$

$$= \begin{bmatrix} v_1/\sigma_1 \\ v_2/\sigma_1 \\ (v_3 - s'_{1,3}\tilde{y}_1 - s'_{2,3}\tilde{y}_2)/\beta_3 \\ (v_4 + s'_{2,3}\tilde{y}_1 - s'_{1,3}\tilde{y}_2)/\beta_3 \\ (v_5 - s'_{1,5}\tilde{y}_1 - s'_{2,5}\tilde{y}_2 - t'_{3,5}\tilde{y}_3 - t'_{4,5}\tilde{y}_4)/\beta_5 \\ \vdots \\ \left[ v_{2k-1} - s'_{1,2k-1}\tilde{y}_1 - s'_{2,2k-1}\tilde{y}_2 - \sum_{i=2}^{k-1}(t'_{2i-1,2k-1}\tilde{y}_{2i-1} + t'_{2i,2k-1}\tilde{y}_{2i}) \right] / \beta_{2k-1} \\ \left[ v_{2k} + s'_{2,2k-1}\tilde{y}_1 - s'_{1,2k-1}\tilde{y}_2 - \sum_{i=2}^{k-1}(-t'_{2i,2k-1}\tilde{y}_{2i-1} + t'_{2i-1,2k-1}\tilde{y}_{2i}) \right] / \beta_{2k-1} \end{bmatrix}$$

(75)

At this point, the ED metrics $T(x)=\|\tilde{y}-Rx\|^2$ can be computed and used to apply the simplified hard- and soft-output demodulation and demapping principles as described above.

As noted above, channel state information is assumed to be known at the receiver 104. The receiver 104 may include a set of rules having as input the (complex) received vector observations, the (complex) gain channel paths between the transmit and receive antennas 106-108, and the properties of the desired QAM (or PSK) constellation to which the symbols belong. In these embodiments, channel state information (matrix H in Equation (1)) is assumed to be known at the receiver 104. The methods in FIGS. 2A and 2B could include the use of a set of rules that allows the detector 110 to have as input the (complex) received vector Y in Equation (1), the (complex) channel paths between the transmit and receive antennas 106-108 (entries of H), and the properties of the desired QAM (or PSK) constellation to which the symbols belong.

Also, as noted above, the ordering of the layers (transmit antennas 106) considered for successive detection may have a very important impact on the performance in cases of hard-output detection. The methods 200a-200b may implement a layer ordering algorithm (via stages 203a-203b), and the methods 200a-200b may then include the following sequence of steps (to be repeated a given number of times according to the implemented ordering technique). The methods 200a-200b permute pairs of columns of the channel matrix and pre-process the permuted channel matrix in order to factorize it into product terms, one of which is a triangular matrix based on the processed channel coefficients. The methods 200a-200b also define and properly compute the post-processing SNR for the considered layers. The methods 200a-200b then determine the order of the layers by applying a given criterion based on the value of the SNRs.

In particular embodiments, an SNR-based layer ordering is used to select the ordering of the layers. The post-detection SNR of the different layers can be determined based on the value of the diagonal elements of the triangular matrix $\tilde{R}$ (or R, depending on the considered embodiment) and the noise variances (which may be given by either vector Equation (56) or scalar $N_0/2$ depending on the used embodiment) proceeding from bottom to top and assuming perfect interference cancellation from the lower layers. Using the notation previously defined, the SNR for the generic $k^{th}$ layer can be given by:

$$SNR_k = \frac{E_s}{N_0} \frac{r_{2k-1}^2}{\|q_{2k-1}\|^2}$$

$$= \frac{E_s}{N_0} \frac{r_{2k-1}}{\left(\prod_{j=1}^{k-1} r_{2j-1}\right) \|h_1\|^2}$$

$$= \frac{E_s}{N_0} \begin{bmatrix} \sigma_{2k-1}^2 - (s_{1,2k-1}^2 - s_{2,2k-1}^2)/\sigma_1^2 - \\ \sum_{i=2}^{k-1} (t_{2i-1,2k-1}^2 - t_{2i,2k-1}^2)/\beta_{2i-1}^2 \end{bmatrix}.$$

(76)

The SNR of a given layer may depend on the ordering considered for the detection of the transmitted symbols. A simple yet very powerful ordering technique can be derived for the case of hard-output demodulation. The hard-output demodulation concepts outlined above remain valid. In addition, the fundamental idea of the ordering algorithm is to select as a "reference" (bottom) layer, for which all candidate symbols in the complex constellation are searched, the one characterized by the worst SNR. The remaining layers are ordered in terms of their SNRs in a decreasing order (O-DFE) from layer T-1 up to the first layer. This corresponds to a simplified approximated version of the optimal "maxi-min" ordering criterion established for O-DFE and generalized for ML-DFE. It may, however, nevertheless yield performance very close to the optimum.

For the GSO processing described with respect to stage 204, a fundamental property holds for $SNR_k$ in Equation (76), which is also fundamental to keeping a limited overall complexity of the algorithm: the invariance of $SNR_k$ to the disposition of the layers from 1 to j with j<k. As a consequence, proceeding from bottom (j=T) to top (j=1), there are j possible different values for $SNR_j$ that can be computed considering as many different layer permutations, where each of the j layers in the set has to be placed at the $j^{th}$ position once and only once. The overall number of permutations to be considered is therefore equal to T*(T+1)/2 instead of T!.

For every considered layer permutation, the columns of the channel matrix $H_r$ are permuted accordingly prior to the GSO processing. Recalling that the QR computes the matrix R line by line from top to bottom and the matrix Q columnwise from left to right, it follows that the set of layer index permutations should be optimized so that they differ for the least possible number of indexes. In this way, the GSO is executed only partly (for the minimum number of operations required in order to update the terms in Equation (76)).

From the above considerations, the following layer ordering algorithm can be derived. First, the layers corresponding to the original channel matrix $H_r$ are enumerated according to the natural integer sequence $\pi_{T,1}=1, 2, \ldots T$. Next, the GSO of the channel matrix $H_r$ is computed. After that, starting from the bottom layer (k=T), since $SNR_T$ is only a function of the layer in the last position (regardless of the disposition of the other layers), determine the T possible different values for $SNR_T$. This requires selecting T layer dispositions $\pi_{T,j}$ with $j=1, \ldots, T$. An efficient set of such permutations is the following: start from two initial dispositions (cases a and b) and exchange the last element with each one of the T/2 $2^{nd}$ half elements, such as by:

1. If T is an even number:
   a) $\pi_{T,1}=1, 2, \ldots T; \pi_{T,2}=1, 2, \ldots T-2, T, T-1; \ldots; \pi_{T,T/2}=1, 2, \ldots T/2, T/2+2, T/2+3, \ldots T/2+1$
   b) $\pi_{T,T/2+1}=T/2+1, T/2+2, \ldots T, 1, 2, \ldots T/2; \pi_{T,T/2+2}=T/2+1, T/2+2, \ldots T, 1, 2, \ldots T/2-2, T/2, T/2-1; \ldots$
   $\pi_{T,T}=T/2+1, T/2+2, \ldots T, 2, 3, \ldots T/2, 1$.

2. If T is an odd number:
   a) $\pi_{T,1}=1, 2, \ldots T; \pi_{T,2}=1, 2, \ldots T-2, T, T-1; \ldots; \pi_{T,\lfloor T/2 \rfloor}=1, 2, \ldots \lfloor T/2 \rfloor, \lfloor T/2 \rfloor+2, \lfloor T/2 \rfloor+3, \ldots \lfloor T/2 \rfloor+1$
   b) $\pi_{T,\lfloor T/2 \rfloor+1}=\lfloor T/2 \rfloor+1, \lfloor T/2 \rfloor+2, \ldots T, 1, 2, \ldots \lfloor T/2 \rfloor$; $\pi_{T,\lfloor T/2 \rfloor+2}=\lfloor T/2 \rfloor+1, \lfloor T/2 \rfloor+2, \ldots T, 1, 2, \ldots \lfloor T/2 \rfloor-2, \lfloor T/2 \rfloor, \lfloor T/2 \rfloor-1; \ldots; \pi_{T,T}=\lfloor T/2 \rfloor+1, \lfloor T/2 \rfloor+2, \ldots T, 2, \ldots \lfloor T/2 \rfloor, 1$.

The columns of $H_r$ may be permuted accordingly prior to undergoing the GSO, and only the entries of $\tilde{R}$ corresponding to the layer indexes that changed from one permutation to the other are updated in order to compute Equation (76). The T SNR values are compared, and the layer characterized by the minimum SNR is selected as the $T^{th}$ one. This layer becomes the "reference" layer, and all possible $M^2$ lattice points (for an $M^2$-QAM constellation) are searched for it. A similar sequence of operations may be repeated for the $k^{th}$ layer (where k=T-1, ..., 2). At each stage, k different $SNR_k$ values may be determined, specifically k permutations $\pi_{k,j}$ (with j= 1, ..., k) are selected in order to compute $SNR_{k,j}$. The processing complexity may be minimized similar to what was described above for k=T. The criterion is then to select the $k^{th}$ layer based on $$\max_j SNR_{k,j}.$$

The rationale is to reduce as much as possible the effect of error propagation as with O-DFE. The same ordering operations can be repeated until k=2, as this may also determine the chosen layer for k=1. Once the final layer sequence is determined, a possible final GSO process is computed if required, and the ED metrics and the overall hard-output sequence estimates can be computed as outlined above.

This method can be very powerful if hard-output decisions are generated. The overall processing complexity could be in the order of $O(T^3)$ up to T=4. "Partial" ordering schemes can also be applied. The criterion used to select the bottom layer may not change, while partial ordering schemes include applying the O-DFE criterion to a subset of layers (from one up to the maximum number T-1).

For soft-output generation, this proposed ordering technique could be applied only partially as T parallel LLR computation processes are performed, where each layer is the reference. This implies that the layer ordering scheme should be modified. More specifically, the layer ordering scheme can be applied starting from layer T-1. This holds for each of the T sets of T-1 layers. In fact, T parallel GSO processes may need to be computed, where T different layers in turn are the reference. In each case, the remaining T-1 layers can be placed in order of decreasing SNR as for the O-DFE. In other words, for every considered permutation $\pi_j$ (with j=1, ..., T), decreasing order SNR disposition of layers from $\pi_j(T-1)$ to $\pi_j(1)$ can be performed to enhance the performance. "Partial" ordering schemes can also be applied. The simplest one could include selecting as the upper layer, for each of the T considered sets of layers required for LLR computation, the one layer characterized by the minimum SNR. This can be done by comparing the values of $\|h_k\|^2$ for the T-1 layers in each of the T sets and selecting the minimum.

These detection techniques may present several advantages over conventional MIMO detection techniques. For example, compared to the linear ZF and MMSE detectors, the techniques in this disclosure may present comparable pre-processing complexity (in the order of $O(T^3)$ for up to T=4) but replaces the linear weighting of the receiver vector with a lattice search that results in a significant performance gain. Also, the algorithm here may use S lattice points instead of the $S^2$ points required by the full-complexity ML detector for hard-demapping. This number may increase to 2S for max-log bit LLR generation and T=2 transmit antennas 106. For T>2 transmit antennas 106, the algorithm may be able to achieve hard-output near-optimal performance while searching S lattice points (instead of $S^T$ as for ML). In the case of bit soft-output generation, this number may increase to T·S, and the algorithm performance may be near ML.

Also, compared to the non-linear O-DFE detectors, even those implemented through the most efficient algorithms, the algorithm of this disclosure may be characterized by a channel pre-processing complexity of comparable complexity (an order of $O(T^3)$ up to T=4) and replaces the initial symbol estimates with a lattice search that results in a significant performance gain at the expense of moderate extra-complexity. In particular, as previously mentioned, thanks to the ordering techniques discussed above, the algorithm is able to achieve near-optimal hard-output performance up to a very high number of T>2 transmit antennas 106 searching a constant number of S lattice points (instead of $S^T$ as for ML). On the contrary, the performance of O-DFE is far from ML. Also, no strategy to compute bit LLRs has been outlined for the O-DFE algorithm, and this disclosure may achieve near-ML performance in MIMO-OFDM BICM systems.

Compared to the combined ML, DFE, or list detectors, this disclosure entails several additional advantages. The hard output version of the algorithm might be considered a sub-class of the list detectors, where the Euclidean distance terms of all possible constellation symbols are computed for a reference layer and the remaining symbol estimates are determined through direct ZF-DFE (or spatial DFE or IC and nulling). The algorithm may operate in the real domain, while the former LD algorithms operate in the complex-domain. This is done by keeping computational efficiency thanks to the "lattice formulation" alternative, which allows the algorithm to treat separately the I and Q couples of complex modulated symbols. The real-domain representation constitutes a significant enhancement because, by independently dealing with the I and Q couples of complex symbols, it allows the same degree of parallelism of the complex-valued sphere decoders to be kept, formerly considered the necessary hardware choice in order not to double the depth of the equivalent "tree" and simplify the VLSI implementation. Also, it allows saving complexity in the demodulation and demapping stage (stages 206a-206b), both for the hard-output and soft-output versions. Further, one of its consequences is a straightforward proof of the optimality of the algorithm for T=2 in both the hard-output and soft-output (max-log approximation). In addition, in the hard-output case, layer ordering may be essential to achieve near-ML. The "maxi-min" (maximization of the worst-case post-detection SNR) optimal layer ordering method could be applied to the algorithm in the real domain. However, the ordering algorithm described above represents a simplified suboptimal version of the "maxi-min", yet it performs very close to the optimal one and to ML. Also, the algorithm described above is able to keep an $O(T^3)$ complexity up to T=4. Further, the algorithm described above provides a reliable technique to compute bit soft-output information, representing a major differentiating feature compared to state-of-the-art LDs.

In addition, compared to existing lattice search-based algorithms, the detector here may solve many or all of the main issues of the SD algorithm. It is a parallel detection algorithm, thus suitable for VLSI implementations. It also searches for a deterministic number of lattice points, and the resulting latency may not be variable. It yields optimal performance for two transmit antennas 106 (in the max-log sense if soft-output) and near-optimal for more than two transmit antennas 106. In addition, it allows for generating bit LLRs using a parallel search of a deterministic number of lattice points, which yields optimal max-log APPs for two transmit antennas 106 and a good approximation of the optimal max-log for a higher number than two.

Although FIGS. 2A and 2B illustrate examples of methods 200a-200b for detecting multiple communication sources, various changes may be made to FIGS. 2A and 2B. For example, any other or additional ordering technique could be used to order the layers in stages 203a-203b.

FIGS. 3 through 17 illustrate example performances of a detection algorithm in different systems in accordance with this disclosure. In particular, FIGS. 3 through 17 illustrate example performances of the detector 110 implementing the detection algorithm described above. The performances shown in FIGS. 3 through 17 are for illustration only. The detector 110 could operate in any other suitable manner depending, for example, on the implementation.

Figure 3:
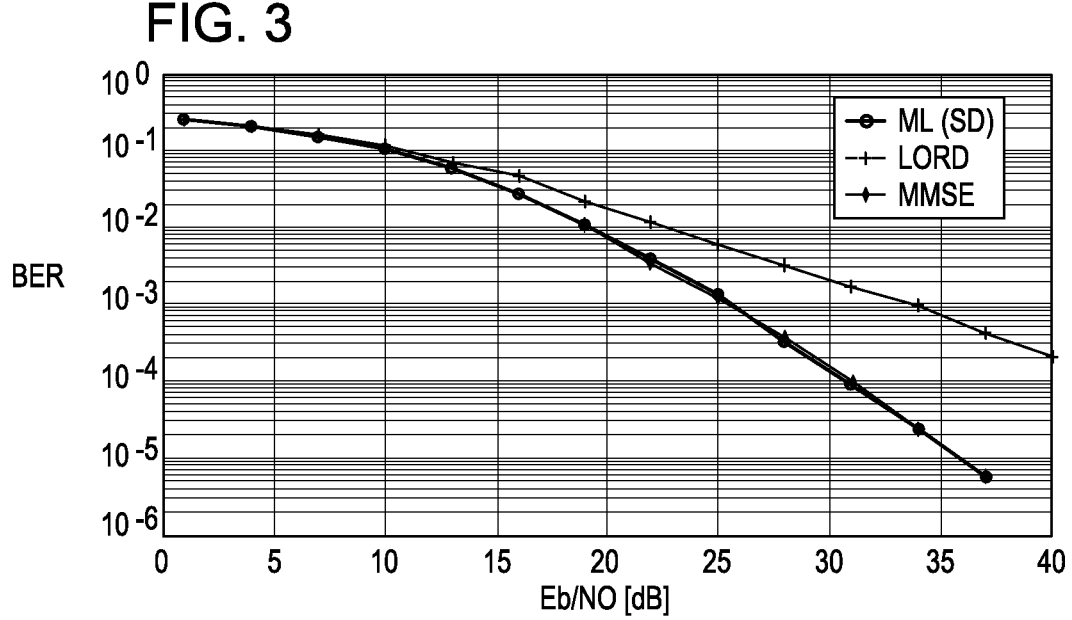
FIGS. 3 through 17 illustrate example performances of a detection algorithm in different systems in accordance with this disclosure.
Figure 4:
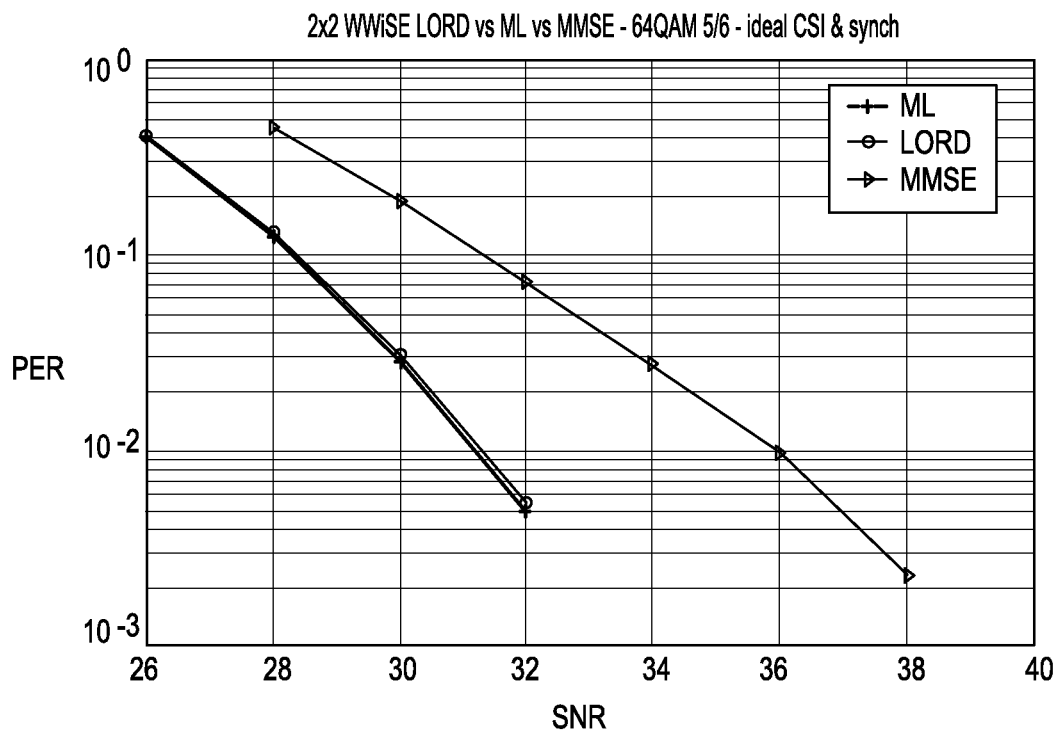

FIG. 3 illustrates the performance of the detection algorithm described above (denoted "LORD" for layered orthogonal lattice detector) in an uncoded 2×2 MIMO system supporting 64 QAM. FIG. 4 illustrates the performance of the detection algorithm described above in a 2×2 MIMO-OFDM BICM system using convolutional coded 64 QAM, code rate 5/6, and channel model D as specified by the IEEE TGn task group. The "2×2" indicates the use of two transmit antennas 106 and two receive antennas 108.

Figure 5:
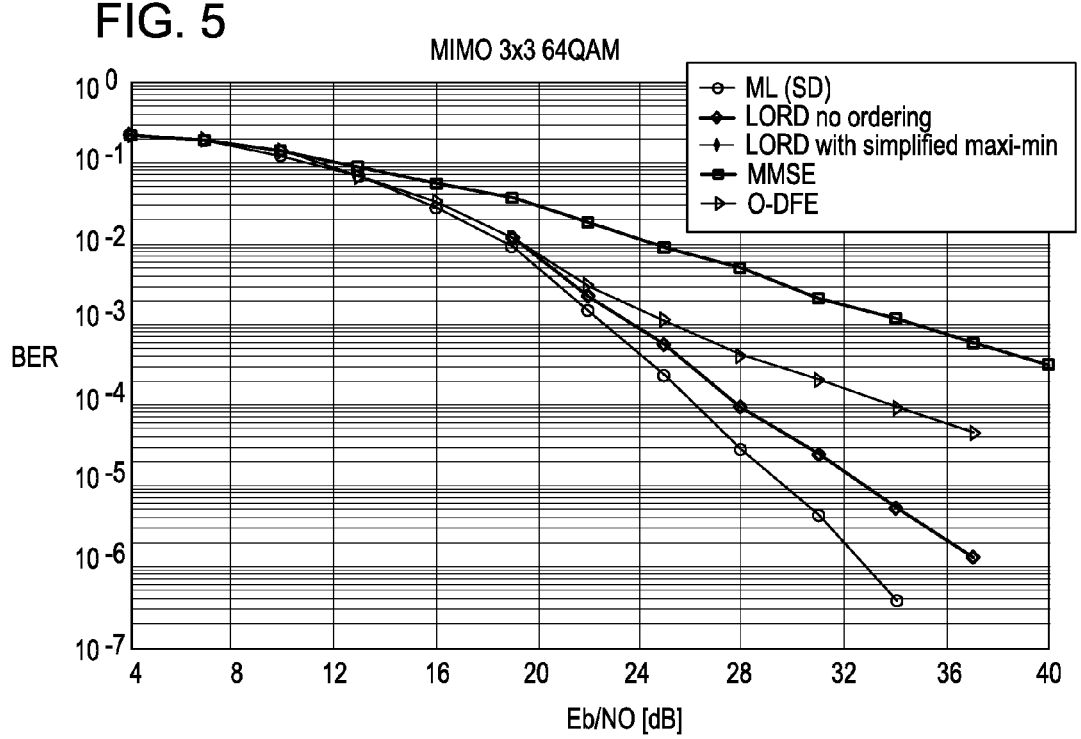

FIG. 5 illustrates the performance of the detection algorithm using different ordering techniques in an uncoded 3×3 MIMO system supporting 64 QAM. Similarly, FIGS. 6 through 9 illustrate the performance of the detection algorithm using different ordering techniques in an uncoded 4×4 MIMO system supporting 16 QAM, an uncoded 4×4 MIMO system supporting 64 QAM, an uncoded 6×6 MIMO system supporting 64 QAM, and an uncoded 8×8 MIMO system supporting 64 QAM, respectively.

Figure 13:
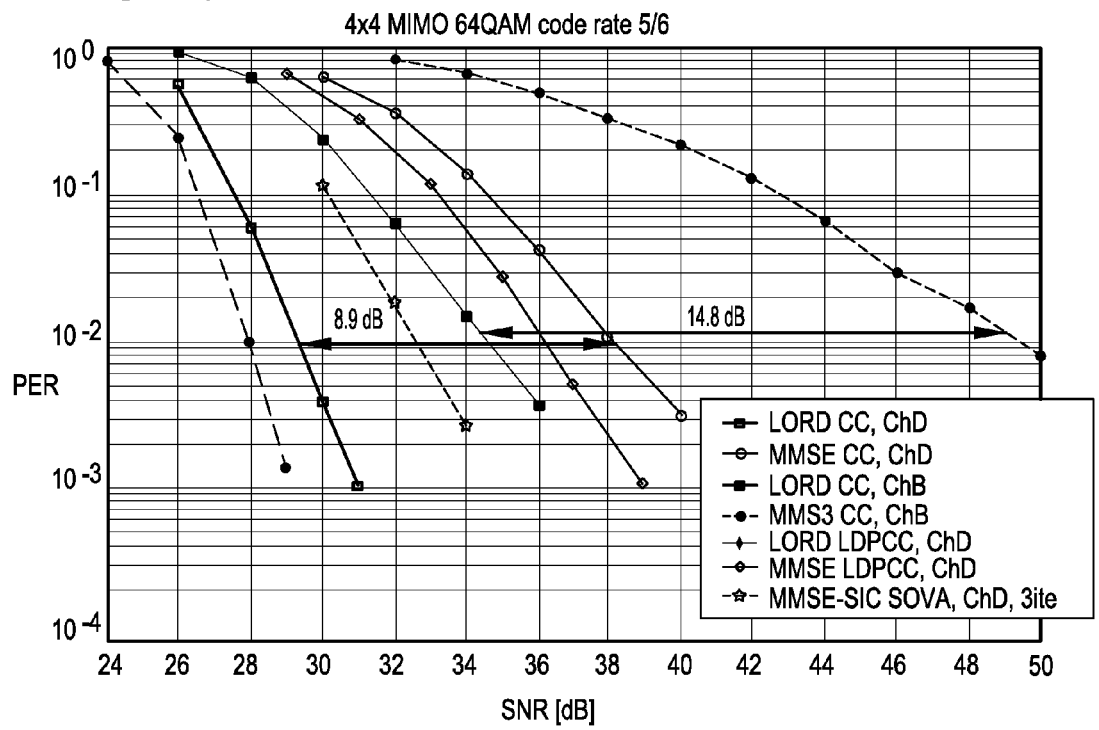
Figure 14:
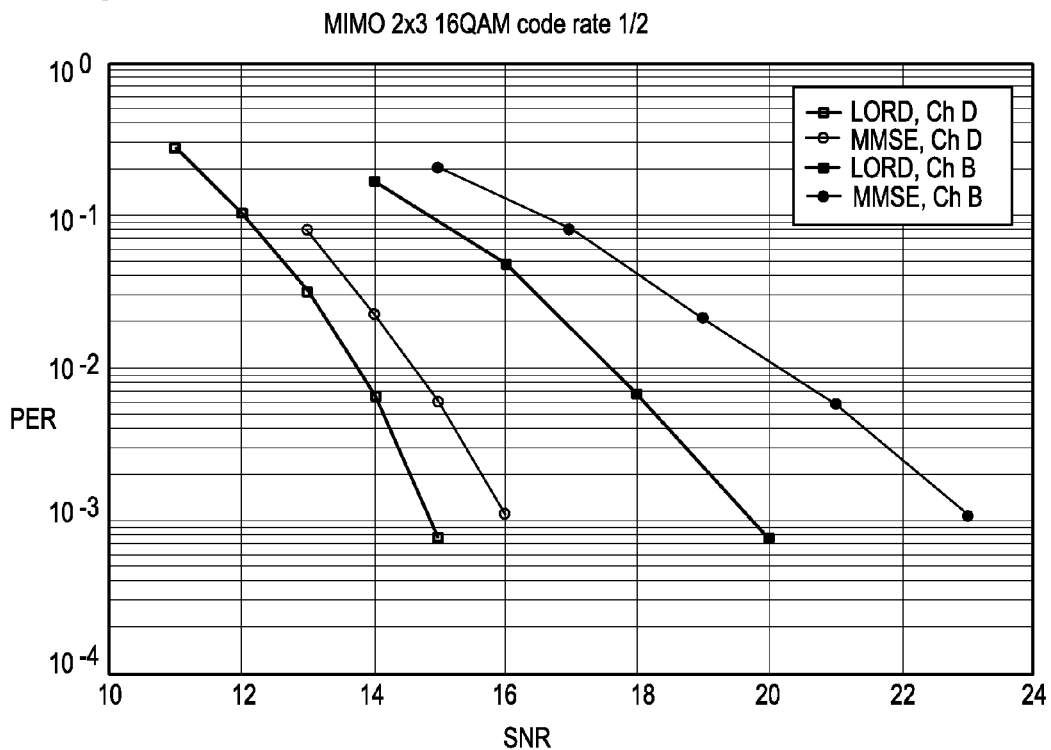
Figure 15:
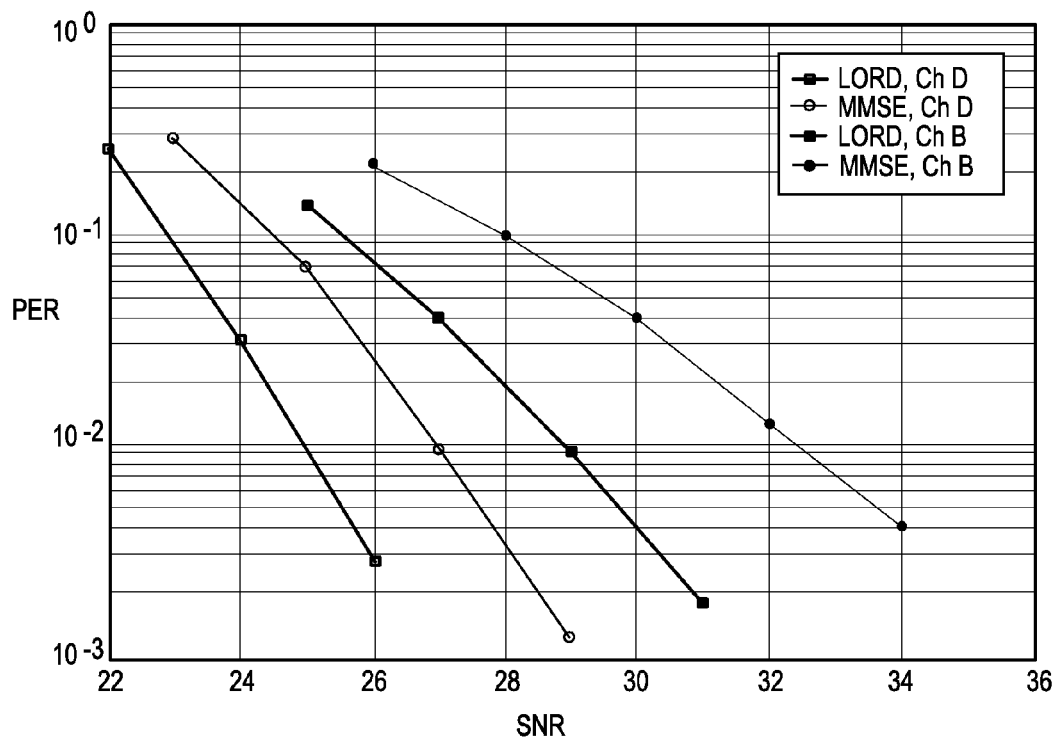
Figure 16:
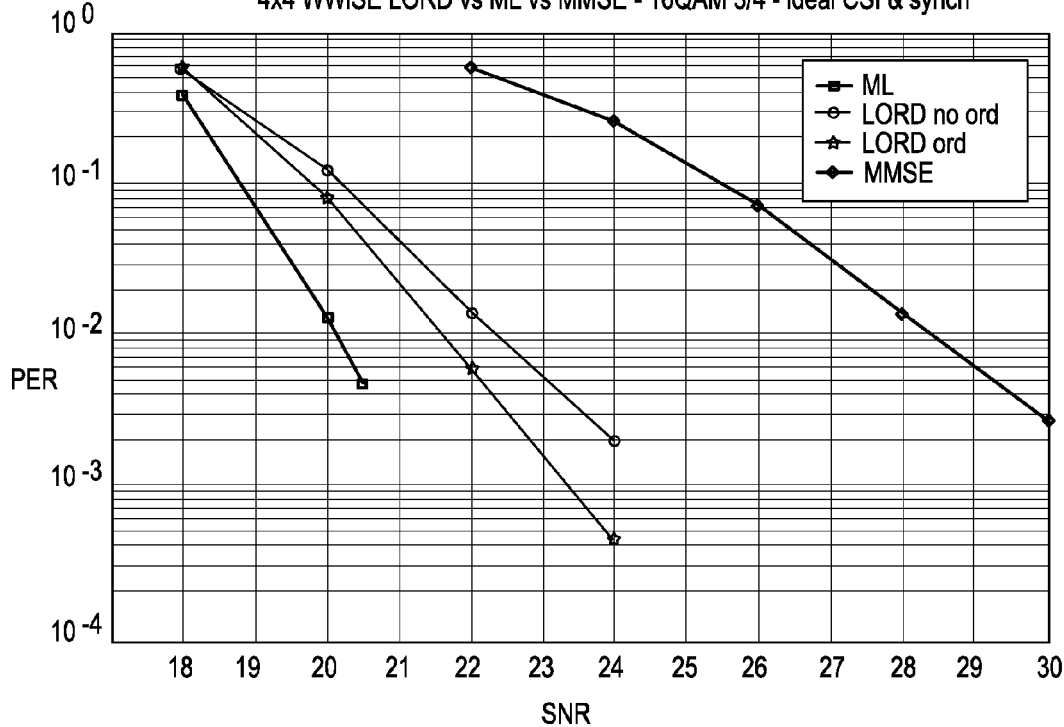
Figure 17:
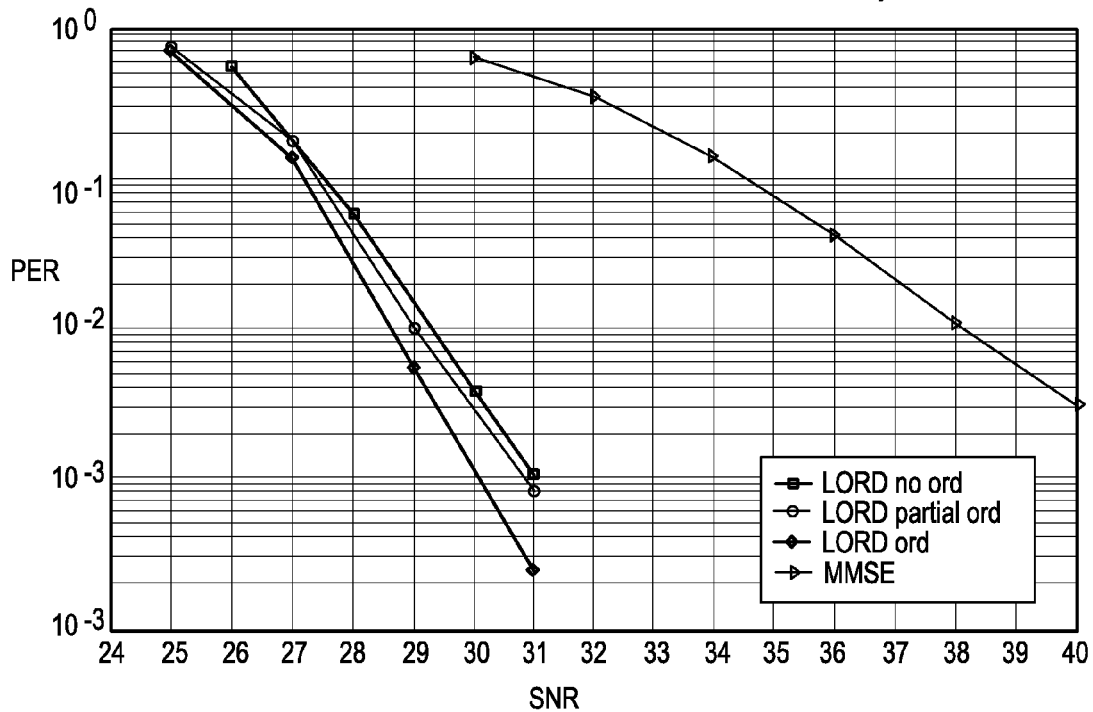

FIGS. 10 through 15 illustrate the performance of the detection algorithm in: a 3×3 MIMO-OFDM system supporting convolutional coded 16 QAM, code rate 3/4, channel model D (FIG. 10); a 4×4 MIMO-OFDM system supporting convolutional coded 16 QAM, code rate 3/4, channel model D (FIG. 11); a 3×3 MIMO-OFDM system supporting convolutional coded 64 QAM, code rate 5/6, channel model B and D (two different frequency selective channel models specified by the IEEE TGn task group) (FIG. 12); a 4×4 MIMO-OFDM supporting convolutional coded and Low Density Parity Check Codes ("LDPCC") 64 QAM, code rate 5/6, channel model B and D (FIG. 13); a 2×3 MIMO-OFDM system supporting convolutional coded 16 QAM, code rate 1/2, channel model B and D (FIG. 14); and a 2×3 MIMO-OFDM system supporting convolutional coded 64 QAM code rate 5/6, channel model B and D (FIG. 15). FIGS. 16 and 17 illustrate the performance of the detection algorithm using soft-output ordering for a 4×4 MIMO-OFDM system supporting convolutional coded 16 QAM, code rate 3/4, channel model D (FIG. 16); and a 4×4 MIMO-OFDM system supporting convolutional coded 64 QAM, code rate 5/6, channel model D (FIG. 17).

As shown in these figures, the performance of the detection algorithm described above (with or without ordering) is generally closer to optimum than conventional techniques. For example, as shown in FIGS. 3 and 4, the algorithm is able to achieve optimal (ML) performance in the case of two transmit antennas 106, as opposed to the MMSE scheme.

Figure 6:
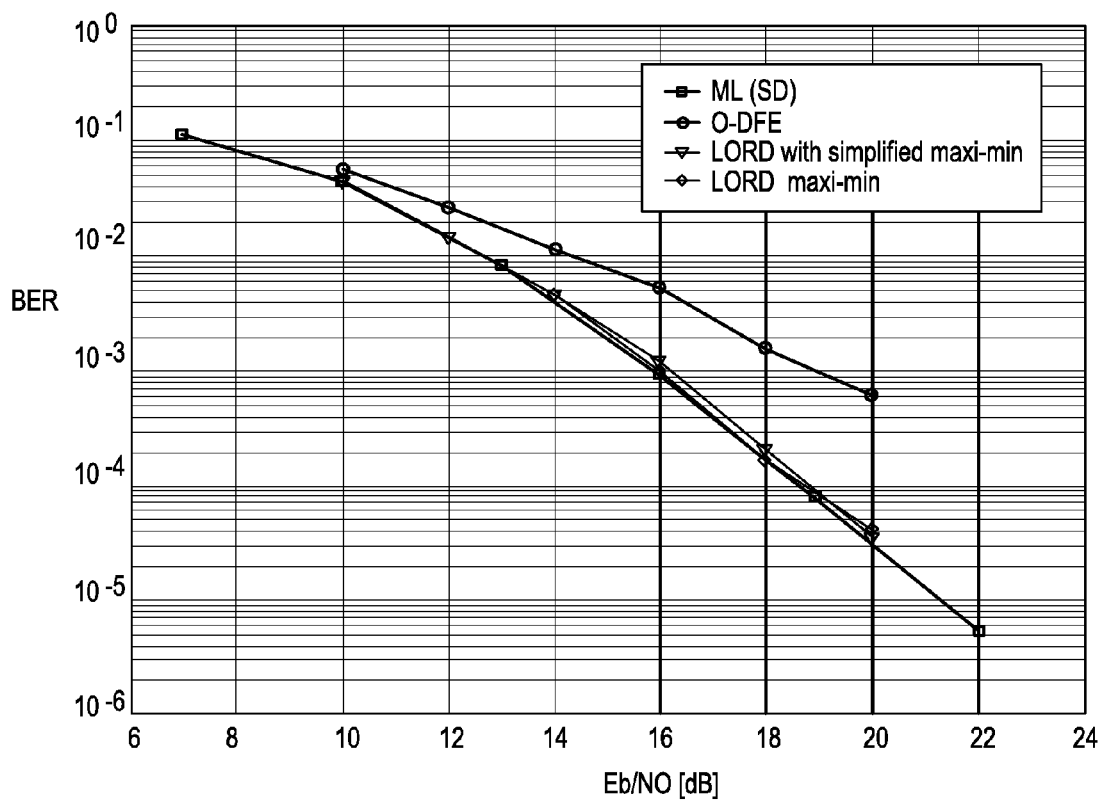
Figure 7:
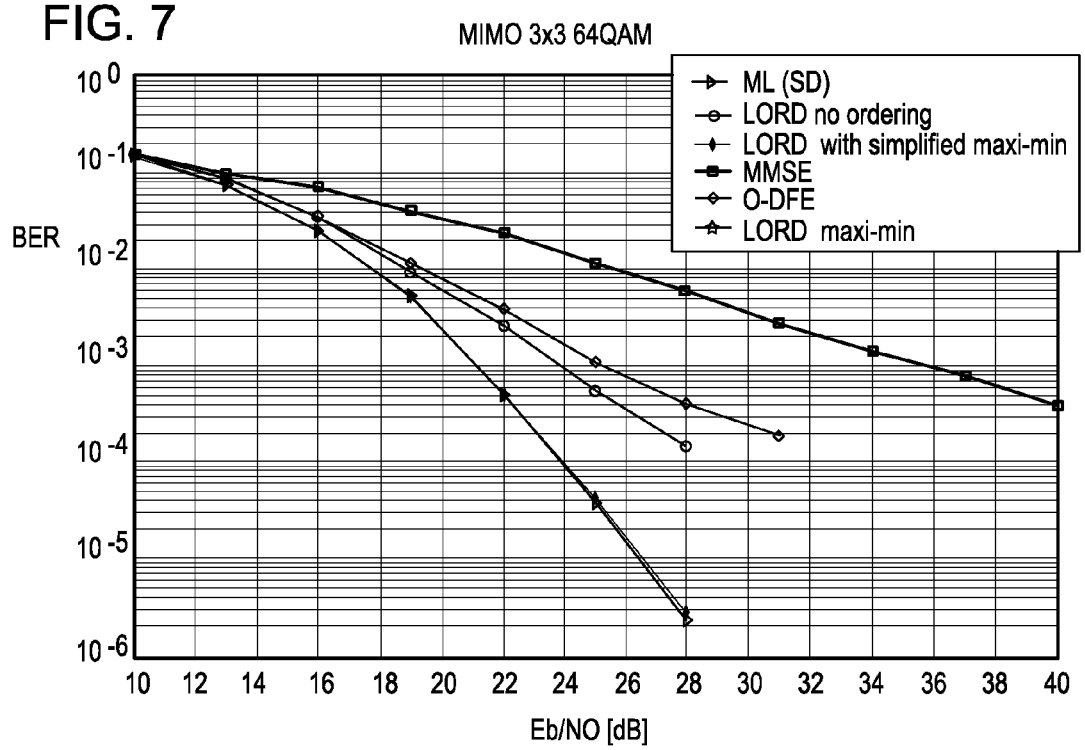
Figure 8:
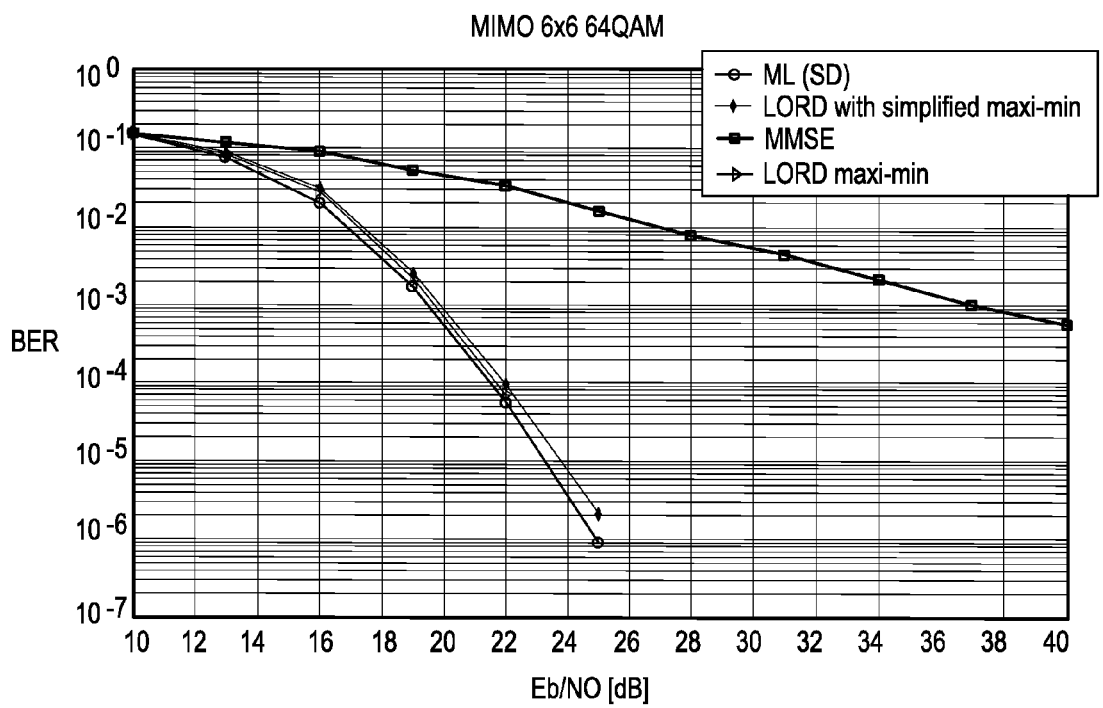
Figure 9:
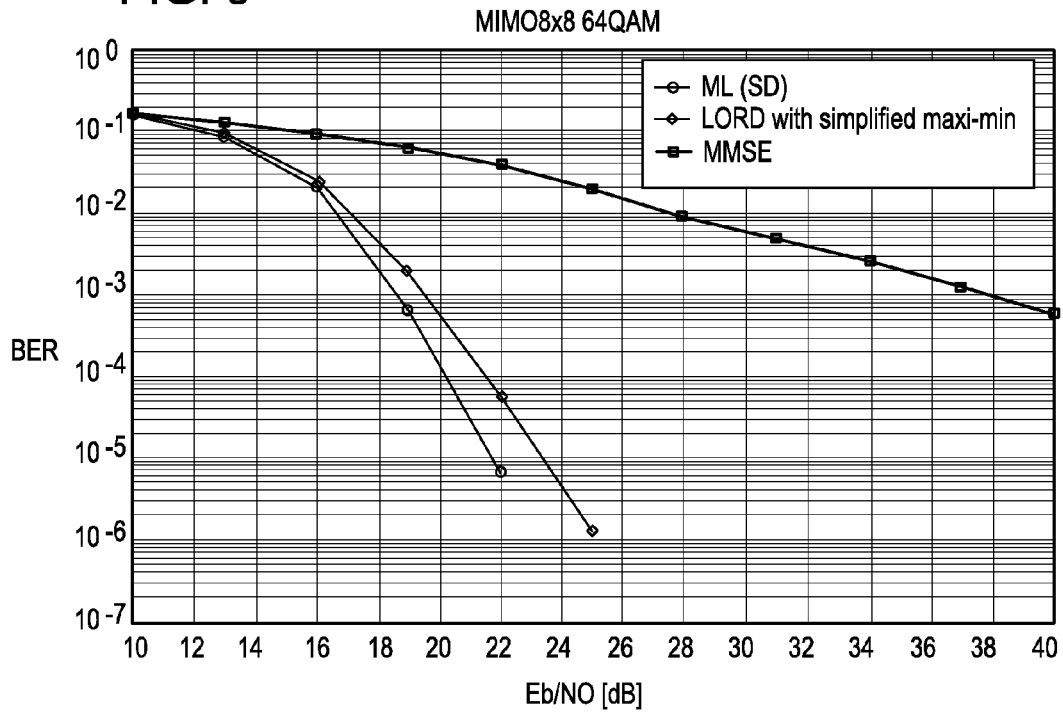

As shown in FIGS. 5 through 9, for T>2 transmit antennas 106, the algorithm enhanced with layer ordering is able to achieve hard-output near-optimal performance. Using the simplified approximated version of the optimal "maxi-min" ordering described above, the algorithm is able to achieve hard-output performance that is very close to optimum and very close to an algorithm supporting the optimal "maxi-min" technique. Also, as shown in FIGS. 5 through 7, the performance of O-DFE is generally far from ML.

Figure 10:
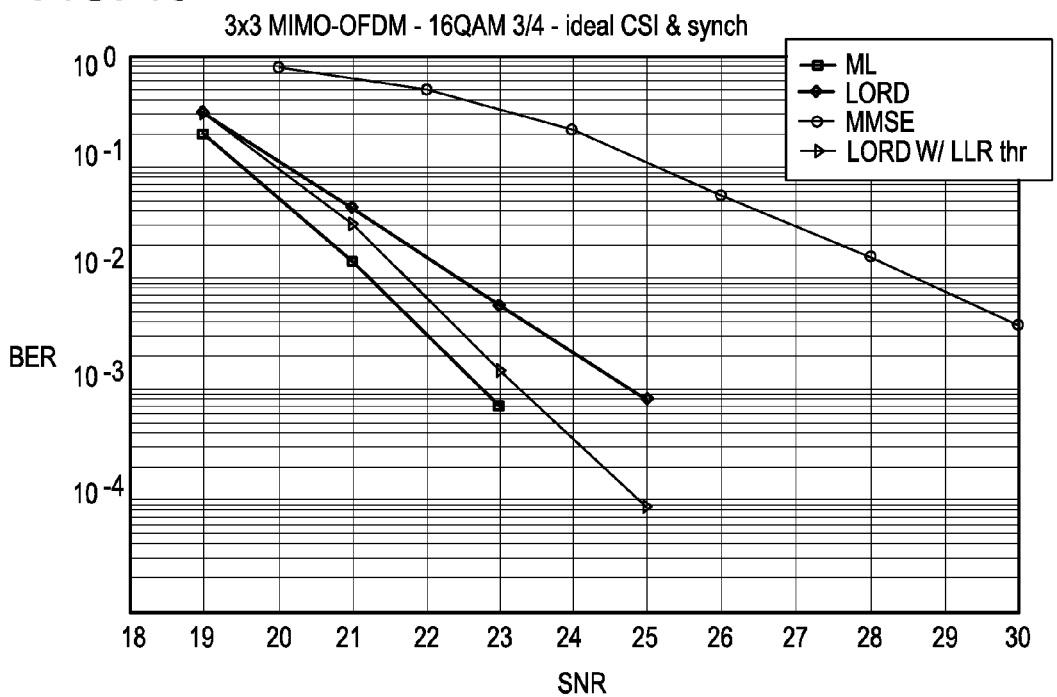
Figure 11:
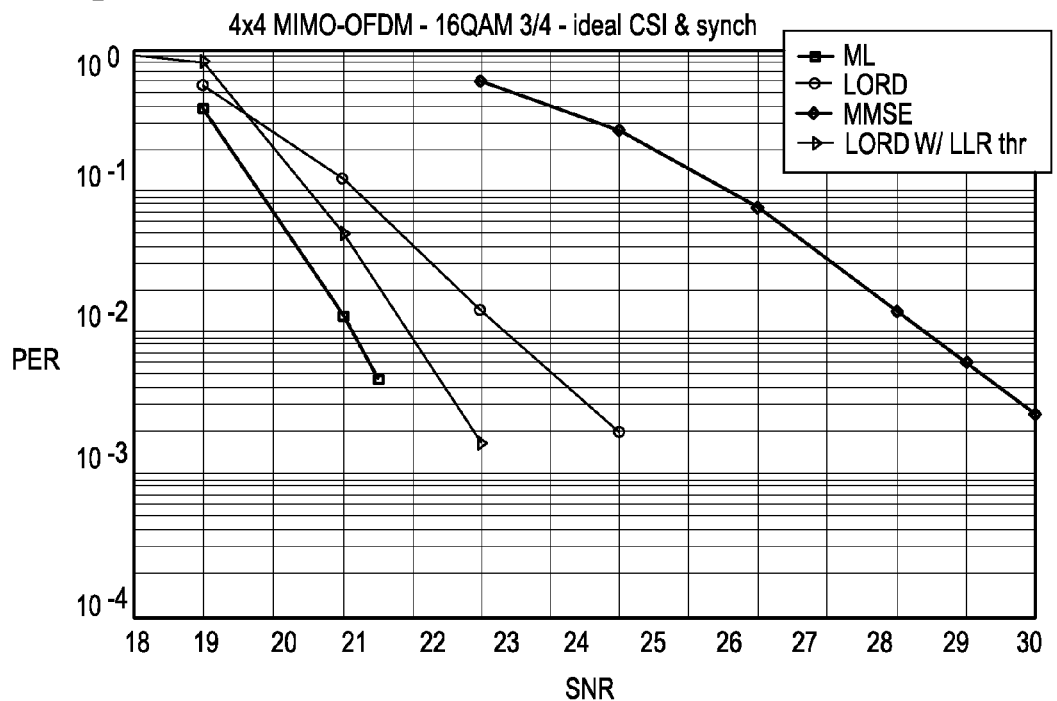
Figure 12:
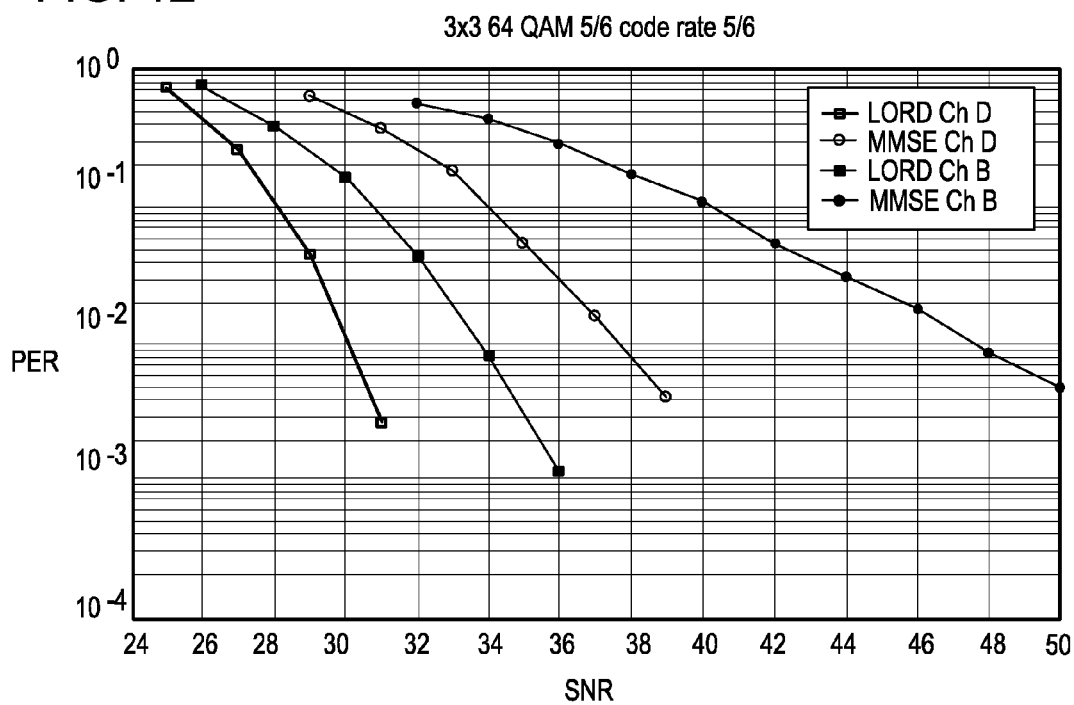

As shown in FIGS. 10 through 13, in the case of bit soft-output generation, the algorithm's performance is still near-ML, and the gain over MMSE is very high (despite the increase in the number of transmit antennas 106). Moreover, as noted regarding Equation (68), an LLR threshold can be used to limit the unreliability of the LLRs for suboptimal detection systems. FIGS. 10 and 11 illustrate the performance of the detection algorithm using LLR thresholds, which may allow near-ML performance (for MIMO systems with T>2).

FIG. 13, for comparison, also illustrates the performance obtained employing advanced ECC, such as Low Density Parity Check Codes ("LDPCC") with approximately a 2,000-bit codeword length, or iterative detection techniques. FIG. 13 involves T=4 transmit antennas 106. The performance of iterative MMSE Soft-Interference Cancellation ("SIC") with convolutional coded ECC and soft-output Viterbi algorithm ("SOVA") is reported. Here, it can be seen that a single stage of the detector algorithm shows more than a 3 dB gain compared to MMSE-SIC at $10^{-2}$ packet error rate (PER), for a 1,000-byte packet length. Using LDPCC instead of convolutional coding provides SNR contained within 2 dB at the same target PER, using either "LORD" or MMSE. In general, the algorithm described above may be able to achieve a higher diversity order compared to linear detectors, approaching R for T>2 and equal to two for two transmit antennas 106, with a linear (instead of exponential) increase in complexity for an increasing number of transmit antennas 106 and bit soft-output generation. This also explains why the gain over MMSE is higher if a less frequency-selective channel is used, such as channel model B instead of channel model D. In fact, MMSE may not yield receive diversity if R=T, and MMSE may require a fairly frequency-selective channel in BICM systems together with a low code rate ECC to compensate for the spatial diversity loss. In that case, advanced ECC does not appear to be the right solution to recover the performance loss caused by the linear detector, unless a near-optimal detection stage is placed before the ECC decoder. For asymmetrical systems like 2×3 MIMO configurations, the gain of the algorithm described above over MMSE may be lower than 2×2 but still significant, especially with channel model B and higher code rates, as shown in FIGS. 14 and 15.

In addition, for soft-output generation, the ordering technique described above can be partially applied. The performance benefit of this ordering technique in MIMO-OFDM BICM systems is shown in FIGS. 16 and 17.

Although FIGS. 3 through 17 illustrate examples of performances of a detection algorithm in different systems, various changes may be made to FIGS. 3 through 17. For example, the detector 110 implementing the detection algorithm could be used in other systems not associated with FIGS. 3 through 17. Also, the detector 110 could operate differently than shown in FIGS. 3 through 17.

In some embodiments, various functions described above may be implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. However, the various coding functions described above could be implemented using any other suitable logic (hardware, software, firmware, or a combination thereof).

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. A method for detecting sequences of digitally modulated symbols transmitted by multiple sources and received at a receiver, the method comprising:
   determining a real-domain representation that separately treats in-phase and quadrature components of a received vector, channel gains, and a transmitted vector transmitted by the multiple sources;
   processing the real-domain representation to obtain a triangular matrix;
   performing, at the receiver, a reduced-complexity search of a number of transmit sequences and at least one of: (i) hard-decision detection of a transmitted sequence and demapping of corresponding bits based on the reduced-complexity search of the number of transmit sequences, and (ii) generation of bit soft-output values based on the reduced-complexity search of the number of transmit sequences, the reduced-complexity search based on the triangular matrix;
   the reduced-complexity search including solving a minimization problem using values of a candidate sequence, the values of the candidate sequence obtained by
      identifying all possible values for in-phase and quadrature components of one or more reference transmitted complex symbols, the possible values representing candidate values, and
      obtaining values of in-phase and quadrature components of one or more remaining symbols through spatial-decision-feedback equalization starting from each candidate value of the one or more reference symbols; and
   the reduced-complexity search including repeating the considering and obtaining steps a number of times equal to a number of transmit antennas, each time associated with a different disposition of layers corresponding to the transmitted symbols, each layer being a reference layer in only one of the dispositions.

2. The method of claim 1, wherein:
   channel-state information and received observations are known at the receiver;
   the channel-state information includes a complex matrix, the complex matrix including entries representing complex-gain channel paths between transmit and receive antennas; and
   the received observations include a complex vector.

3. The method of claim 1, further comprising receiving, as input to a set of rules, one or more properties of a desired quadrature-amplitude-modulation or phase-shift-keying constellation to which the symbols belong.

4. The method of claim 1, wherein processing the real-domain representation includes processing equations of the real-domain representation to produce a factorization of a channel matrix into an orthogonal matrix and a triangular matrix.

5. A method for detecting sequences of digitally modulated symbols transmitted by multiple sources and received at a receiver, the method comprising:
   determining a real-domain representation that separately treats in-phase and quadrature components of a received vector, channel gains, and a transmitted vector transmitted by the multiple sources;

processing the real-domain representation to obtain a triangular matrix; and performing, at the receiver, a reduced-complexity search of a number of transmit sequences and at least one of: (i) hard-decision detection of a transmitted sequence and demapping of corresponding bits based on the reduced-complexity search of the number of transmit sequences, and (ii) generation of bit soft-output values based on the reduced-complexity search of the number of transmit sequences, the reduced-complexity search based on the triangular matrix;

a number of receive antennas being equal to a number of transmit antennas minus one; and processing equations of the real-domain representation includes factorizing the channel matrix into an orthogonal matrix and a triangular matrix with its last two rows eliminated.

6. The method of claim 1, wherein processing the real-domain representation includes:

forming a Gram matrix using a channel matrix; and performing a Cholesky decomposition of the Gram matrix.

7. The method of claim 1, further comprising:

the multiple sources including more than two sources; and ordering at least some layers corresponding to the transmitted symbols based on a post-processing signal-to-noise ratio of different layers.

8. The method of claim 1, wherein the reduced-complexity search at least closely approximates one or more most-likely sequences required for an optimal bit or symbol a-posteriori probability computation.

9. An apparatus for detecting sequences of digitally modulated symbols transmitted by multiple sources, the apparatus comprising a detector circuit configured:

to determine a real-domain representation that separately treats in-phase and quadrature components of a received vector, channel gains, and a transmitted vector transmitted by the multiple sources;

to process the real-domain representation to obtain a triangular matrix; and to perform a reduced-complexity search of a number of transmit sequences and at least one of: (i) hard-decision detection of a transmitted sequence and demapping of corresponding bits based on the reduced-complexity search of the number of transmit sequences, and (ii) generation of bit soft-output values based on the reduced-complexity search of the number of transmit sequences, the reduced-complexity search based on the triangular matrix;

to perform the reduced-complexity search by solving a minimization problem using values of a candidate sequence, the detector circuit configured to obtain the values of the candidate sequence obtained by identifying all possible values for in-phase and quadrature components of one or more reference transmitted complex symbols, the possible values representing candidate values, and obtaining values of in-phase and quadrature components of one or more remaining symbols through spatial-decision-feedback equalization starting from each candidate value of the one or more reference symbols; and to perform the reduced-complexity search by repeating the considering and obtaining operations a number of times equal to a number of transmit antennas, each time associated with a different disposition of layers corresponding to the transmitted symbols, each layer being a reference layer in only one of the dispositions.

10. The apparatus of claim 9, wherein:

channel-state information and received observations are known at the detector circuit;

the channel-state information includes a complex matrix, the complex matrix including entries representing complex-gain channel paths between transmit and receive antennas; and the received observations include a complex vector.

11. The apparatus of claim 9, wherein the detector circuit includes a set of rules having as input one or more properties of a desired quadrature-amplitude-modulation or phase-shift-keying constellation to which the symbols belong.

12. The apparatus of claim 9, wherein the detector circuit is configured to process the real-domain representation by processing equations of the real-domain representation to produce a factorization of a channel matrix into an orthogonal matrix and the triangular matrix.

13. An apparatus for detecting sequences of digitally modulated symbols transmitted by multiple sources, the apparatus comprising a detector circuit configured:

to determine a real-domain representation that separately treats in-phase and quadrature components of a received vector, channel gains, and a transmitted vector transmitted by the multiple source;

to process the real-domain representation to obtain a triangular matrix; and to perform a reduced-complexity search of a number of transmit sequences and at least one of: (i) hard-decision detection of a transmitted sequence and demapping of corresponding bits based on the reduced-complexity search of the number of transmit sequences, and (ii) generation of bit soft-output values based on the reduced-complexity search of the number of transmit sequences, the reduced-complexity search based on the triangular matrix;

a number of receive antennas being equal to a number of transmit antennas minus one; and to process the equations of the real-domain representation of factorizing the channel matrix into a orthogonal matrix and a triangular matrix with its last two rows eliminated.

14. The apparatus of claim 9, wherein the detector circuit is configured to process the real-domain representation by:

forming a Gram matrix using a channel matrix; and performing a Cholesky decomposition of the Gram matrix.

15. The apparatus of claim 9, wherein:

the multiple sources include more than two sources; and the detector circuit is further configured to order at least some layers corresponding to the transmitted symbols based on a post-processing signal-to-noise ratio of different layers.

16. The apparatus of claim 9, wherein the reduced-complexity search at least closely approximates one or more most likely sequences required for an optimal bit or symbol a-posteriori probability computation.

17. The apparatus of claim 9, wherein the detector circuit includes at least one processor and at least one memory configured to store data and instructions used by the at least one processor.

18. A non-transitory computer-readable medium storing program instructions that, when executed by a processor, causes the processor;

to determine a real-domain representation that separately treats in-phase and quadrature components of a received vector, channel gains, and a transmitted vector transmitted by the multiple sources;

to process the real-domain representation to obtain a triangular matrix;

to perform a reduced-complexity search of a number of transmit sequences and at least one of: (i) hard-decision detection of a transmitted sequence and demapping of corresponding bits based on the reduced-complexity search of the number of the number of transmit sequences, and (ii) generation of bit soft-output values based on the reduced-complexity search of the number of transmit sequences, the reduced-complexity search based on the triangular matrix;

to perform the reduced-complexity search by solving a minimization problem using values of candidate sequence, the detector circuit configured to obtain the values of the candidate sequence obtained by identifying all possible values for in-phase and quadrature components of one or more reference transmitted complex symbols, the possible values representing candidate values, and obtaining values of in-phase and quadrature components of one or more remaining symbols through spatial-decision-feedback equalization starting from each candidate value of the one or more reference symbols; and to perform a reduced-complexity search by repeating the considering and obtaining operations a number of times equal to a number to transmit antennas, each time associated with a different disposition of layers corresponding to the transmitted symbols, each layer being a reference layer in only one of the dispositions.

19. A method, comprising:

receiving a respective signal from each of multiple transmit antennas over a channel having a response, each signal having respective components, the signals together representing a sequence of symbols;

generating, for each first value that a first signal can represent, a respective first difference between a received version of the first signal and a respective estimated version of the first signal, a respective estimated version of a second signal for each second value that the second signal can represent, the respective estimated version of the second signal including an estimated contribution from the first signal, and a respective second difference between a received version of the second signal and each estimated version of the second signal; and determining a value represented by the sequence of symbols in response to respective first combinations of each first value and of a second value that yields a smallest second difference corresponding to the first value.

20. The method of claim 19, wherein receiving the respective signal includes receiving the respective signal over a respective group of paths of the channel.

21. The method of claim 19 wherein receiving the respective signal includes receiving the signals with at least one receive antenna.

22. The method of claim 19 wherein receiving the respective signal includes receiving the signals with a number of receive antennas greater than or equal to one less than a number of the transmit antennas.

23. The method of claim 19 wherein:

each of the received signals includes a respective carrier signal having approximately a same wavelength as the other carrier signals; and each transmit antenna is located a respective distance from each other transmit antenna, the respective distance being approximately equal to an integer multiple of one half of the same wavelength.

24. The method of claim 19 wherein:

each of the received signals includes a respective carrier signal having approximately a same wavelength as the other carrier signals; and receiving the respective signal includes receiving the signals with receive antennas that are each located a respective distance from each other receive antenna, the respective distance being approximately equal to an integer multiple of one half of the same wavelength.

25. The method of claim 19 wherein each of the received signals includes:

a respective carrier signal having two orthogonal components; and an information signal having two components that respectively modulate the orthogonal components of the carrier signal.

26. The method of claim 19 wherein each of the received signals includes:

a respective carrier signal having two orthogonal components; and an information signal that quadrature-amplitude modulates the components of the carrier signal.

27. The method of claim 19, further comprising generating, for each first value that a first signal can represent, the respective estimated version of the first signal excluding a contribution from the second signal.

28. The method of claim 19, wherein:

generating the respective estimated version of the second signal includes generating a respective estimated version of a first component of the second signal for each third value that the first component can have, the respective estimated version of the first component including a respective estimated contribution from the first signal, and generating a respective estimated version of a second component of the second signal for each fourth value that the second component can have, the respective estimated version of the second component including a respective estimated contribution from the first signal, and generating the respective second difference includes generating a respective third difference between a received version of the first component of the second signal and each estimated first component of the second signal, generating a respective fourth difference between a received version of the second component of the second signal and each estimated second component of the second signal, and generating each of the respective second differences as a combination of the respective third and fourth differences.

29. The method of claim 19 wherein determining a value represented by the sequence of symbols includes selecting a value corresponding to a combination of a first value and of a second value that yields a smallest sum of the first difference corresponding to the first value and the second difference corresponding to the second value.

30. An apparatus, comprising:
a receiver configured to receive a respective signal from each of multiple transmit antennas over a channel having a response, each signal having respective components, the signals together representing a sequence of symbols; and
a detector configured
to generate, for each first value that a first signal can represent,
a respective first difference between a received version of the first signal and a respective estimated version of the first signal,
a respective estimated version of a second signal for each second value that the second signal can represent, the respective estimated version of the second signal including an estimated contribution from the first signal, and
a respective second difference between a received version of the second signal and each estimated version of the second signal; and
to determine a value represented by the sequence of symbols in response to respective first combinations of each first value and of a second value that yields a smallest second difference corresponding to the first value.

31. A non-transitory computer-readable medium storing instructions that, when executed by one or more computing apparatuses, cause the one or more computing apparatuses, or an apparatus under control of the one or more computing apparatuses:
to receive a respective signal from each of multiple transmit antennas over a channel having a response, each signal having respective components, the signals together representing a sequence of symbols;
to generate, for each first value that a first signal can represent,
a respective first difference between a received version of the first signal and a respective estimated version of the first signal,
a respective estimated version of a second signal for each second value that the second signal can represent, the respective estimated version of the second signal including an estimated contribution from the first signal, and
a respective second difference between a received version of the second signal and each estimated version of the second signal; and
to determine a value represented by the sequence of symbols in response to respective combinations of each first value and of a second value that yields a smallest second difference corresponding to the first value.

32. The of claim 19, further comprising:
generating, for each second value that the second signal can represent,
a respective third difference between a received version of the second signal and
a respective second estimated version of the second signal,
a respective second estimated version of the first signal for each first value that the first signal can represent, the respective second estimated version of the first signal including an estimated contribution from the second signal, and
a respective fourth difference between a received version of the first signal and each second estimated version of the first signal; and wherein determining the value represented by the sequence of symbols includes determining the value in response to respective second combinations of each second value and of a first value that yields a smallest fourth difference corresponding to the second value.

33. The method of claim 32 wherein:
receiving a respective signal includes receiving a first received version of the first signal and a first received version of the second signal with a receive antenna;
generating the respective first difference includes generating the respective first difference between the first received version of the first signal and the respective estimated version of the first signal;
generating the respective second difference includes generating the respective second difference between the first received version of the second signal and each estimated version of the second signal;
generating the respective third difference includes generating the respective third difference between the first received version of the second signal and the respective second estimated version of the second signal; and
generating the respective fourth difference includes generating the respective fourth difference between the first received version of the first signal and each second estimated version of the first signal.

34. The method of claim 32 wherein:
receiving a respective signal includes
receiving a first received version of the first signal and a first received version of the second signal with a first receive antenna, and
receiving a second received version of the first signal and a second received version of the second signal with a second receive antenna;
generating the respective first difference includes generating the respective first difference between the first received version of the first signal and the respective estimated version of the first signal;
generating the respective second difference includes generating the respective second difference between the first received version of the second signal and each estimated version of the second signal;
generating the respective third difference includes generating the respective third difference between the second received version of the second signal and the respective second estimated version of the second signal; and
generating the respective fourth difference includes generating the respective fourth difference between the second received version of the first signal and each second estimated version of the first signal.

35. The method of claim 19, further comprising:
generating, for each second value that the second signal can represent,
a respective third difference between a received version of the second signal and a respective second estimated version of the second signal,
a respective second estimated version of the first signal for each first value that the first signal can represent, the respective second estimated version of the first signal including an estimated contribution from the second signal, and
a respective fourth difference between a received version of the first signal and each second estimated version of the first signal; and
wherein determining the value represented by the sequence of symbols includes
for each digit of the first signal, determining a probability that the digit has a state in response to a difference between a smallest of the sums of the first and second differences corresponding to first values in which the digit has the state and a smallest of the sums of the first and second differences corresponding to second values in which the digit has another state, and for each digit of the second signal, determining a probability that the digit has the state in response to a difference between a smallest of the sums of the third and fourth differences corresponding to second values in which the digit has the state and a smallest of the sums of the third and fourth differences corresponding to second values in which the digit has the other state.

36. The method of claim 19, further comprising:

generating, for each second value that the second signal can represent,
- a respective third difference between a received version of the second signal and a respective second estimated version of the second signal,
- a respective second estimated version of the first signal for each first value that the first signal can represent, the respective second estimated version of the first signal including an estimated contribution from the second signal, and
- a respective fourth difference between a received version of the first signal and each second estimated version of the first signal; and wherein determining the value represented by the sequence of symbols includes
- for each digit of the first signal, determining a probability that the digit has a state in response to a difference between a smallest of the sums of the first and second differences corresponding to first values in which the digit has another state and a smallest of the sums of the first and second differences corresponding to second values in which the digit has the state, and
- for each digit of the second signal, determining a probability that the digit has the other state in response to a difference between a smallest of the sums of the third and fourth differences corresponding to second values in which the digit has the other state and a smallest of the sums of the third and fourth differences corresponding to second values in which the digit has the state.

37. The method of claim 19, further comprising:

generating, for each second value that the second signal can represent,
- a respective third difference between a received version of the second signal and a respective second estimated version of the second signal,
- a respective second estimated version of the first signal for each first value that the first signal can represent, the respective second estimated version of the first signal including an estimated contribution from the second signal, and
- a respective fourth difference between a received version of the first signal and each second estimated version of the first signal; and wherein determining the value represented by the sequence of symbols includes
- for each bit of the first signal, determining a log-likelihood ratio equal to a difference between a smallest of the sums of the first and second differences corresponding to first values in which the digit has a state and a smallest of the sums of the first and second differences corresponding to second values in which the digit has another state, and
- for each bit of the second signal, determining a log-likelihood ratio equal to a difference between a smallest of the sums of the third and fourth differences corresponding to second values in which the bit has the state and a smallest of the sums of the third and fourth differences corresponding to second values in which the bit has the other state.

38. The apparatus of claim 30 wherein the receiver is configured to receive the signals from at least one receive antenna.

39. The apparatus of claim 30 wherein the receiver is configured to receive the signals from a number of receive antennas greater than or equal to one less than a number of the transmit antennas.

40. The apparatus of claim 30 wherein the detector is configured to generate, for each first value that a first signal can represent, the respective estimated version of the first signal excluding a contribution from the second signal.

41. The apparatus of claim 30 wherein the detector is configured:

to generate the respective estimated version of the second signal by
- generating a respective estimated version of a first component of the second signal for each third value that the first component can have, the respective estimated version of the first component including a respective estimated contribution from the first signal, and
- generating a respective estimated version of a second component of the second signal for each fourth value that the second component can have, the respective estimated version of the second component including a respective estimated contribution from the first signal, and to generate the respective second difference by
- generating a respective third difference between a received version of the first component of the second signal and each estimated first component of the second signal,
- generating a respective fourth difference between a received version of the second component of the second signal and each estimated second component of the second signal, and
- generating each of the respective second differences as a combination of the respective third and fourth differences.

42. The apparatus of claim 30 wherein the detector is configured to determine a value represented by the sequence of symbols by selecting a value corresponding to a combination of a first value and of a second value that yields a smallest sum of the first difference corresponding to the first value and the second difference corresponding to the second value.

43. The apparatus of claim 30 wherein the detector is configured:

to generate, for each second value that the second signal can represent,
- a respective third difference between a received version of the second signal and a respective second estimated version of the second signal,
- a respective second estimated version of the first signal for each first value that the first signal can represent, the respective second estimated version of the first signal including an estimated contribution from the second signal, and
- a respective fourth difference between a received version of the first signal and each second estimated version of the first signal; and to determine the value represented by the sequence of symbols by determining the value in response to respective second combinations of each second value and of a first value that yields a smallest fourth difference corresponding to the second value.

44. The apparatus of claim 30 wherein:
the receiver is configured to receive the signals by receiving a first received version of the first signal and a first received version of the second signal from a receive antenna; and
the detector is configured
to generate the respective first difference by generating the respective first difference between the first received version of the first signal and the respective estimated version of the first signal,
to generate the respective second difference by generating the respective second difference between the first received version of the second signal and each estimated version of the second signal,
to generate the respective third difference by generating the respective third difference between the first received version of the second signal and the respective second estimated version of the second signal, and
to generate the respective fourth difference by generating the respective fourth difference between the first received version of the first signal and each second estimated version of the first signal.

45. The apparatus of claim 30 wherein:
the receiver is configured to receive the signals by
receiving a first received version of the first signal and a first received version of the second signal with a first receive antenna, and
receiving a second received version of the first signal and a second received version of the second signal with a second receive antenna; and
the detector is configured
to generate the respective first difference by generating the respective first difference between the first received version of the first signal and the respective estimated version of the first signal,
to generate the respective second difference by generating the respective second difference between the first received version of the second signal and each estimated version of the second signal,
to generate the respective third difference by generating the respective third difference between the second received version of the second signal and the respective second estimated version of the second signal, and
to generate the respective fourth difference by generating the respective fourth difference between the second received version of the first signal and each second estimated version of the first signal.

46. The apparatus of claim 30 wherein the determiner is configured:
to generate, for each second value that the second signal can represent,
a respective third difference between a received version of the second signal and a respective second estimated version of the second signal,
a respective second estimated version of the first signal for each first value that the first signal can represent, the respective second estimated version of the first signal including an estimated contribution from the second signal, and
a respective fourth difference between a received version of the first signal and each second estimated version of the first signal; and
to determine the value represented by the sequence of symbols by
for each digit of the first signal, determining a probability that the digit has a state in response to a difference between a smallest of the sums of the first and second differences corresponding to first values in which the digit has the state and a smallest of the sums of the first and second differences corresponding to second values in which the digit has another state, and
for each digit of the second signal, determining a probability that the digit has the state in response to a difference between a smallest of the sums of the third and fourth differences corresponding to second values in which the digit has the state and a smallest of the sums of the third and fourth differences corresponding to second values in which the digit has the other state.

47. The apparatus of claim 30 wherein the detector is configured:
to generate, for each second value that the second signal can represent,
a respective third difference between a received version of the second signal and a respective second estimated version of the second signal,
a respective second estimated version of the first signal for each first value that the first signal can represent, the respective second estimated version of the first signal including an estimated contribution from the second signal, and
a respective fourth difference between a received version of the first signal and each second estimated version of the first signal; and
to determine the value represented by the sequence of symbols by
for each digit of the first signal, determining a probability that the digit has a state in response to a difference between a smallest of the sums of the first and second differences corresponding to first values in which the digit has another state and a smallest of the sums of the first and second differences corresponding to second values in which the digit has the state, and
for each digit of the second signal, determining a probability that the digit has the other state in response to a difference between a smallest of the sums of the third and fourth differences corresponding to second values in which the digit has the other state and a smallest of the sums of the third and fourth differences corresponding to second values in which the digit has the state.

48. The apparatus of claim 30 wherein the detector is configured:
to generate, for each second value that the second signal can represent,
a respective third difference between a received version of the second signal and a respective second estimated version of the second signal,
a respective second estimated version of the first signal for each first value that the first signal can represent, the respective second estimated version of the first signal including an estimated contribution from the second signal, and
a respective fourth difference between a received version of the first signal and each second estimated version of the first signal; and to determine the value represented by the sequence of symbols by for each bit of the first signal, determining a log-likelihood ratio equal to a difference between a smallest of the sums of the first and second differences corresponding to first values in which the digit has a state and a smallest of the sums of the first and second differences corresponding to second values in which the digit has another state, and for each bit of the second signal, determining a log-likelihood ratio equal to a difference between a smallest of the sums of the third and fourth differences corresponding to second values in which the bit has the state and a smallest of the sums of the third and fourth differences corresponding to second values in which the bit has the other state.

\* \* \* \* \*